(12) United States Patent
Arensmeier et al.

(10) Patent No.: US 12,018,852 B2
(45) Date of Patent: Jun. 25, 2024

(54) HVAC FILTER USAGE ANALYSIS SYSTEM

(71) Applicant: Copeland Comfort Control LP, St. Louis, MO (US)

(72) Inventors: Jeffrey N. Arensmeier, Fenton, MO (US); Priotomo Abiprojo, O'Fallon, MO (US); Paul Layton, Chatham, IL (US); Murray Pickard, St. Ann, MO (US); Horst Jaeschke, Imperial, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 670 days.

(21) Appl. No.: 17/048,993

(22) PCT Filed: Apr. 19, 2019

(86) PCT No.: PCT/US2019/028409
§ 371 (c)(1),
(2) Date: Oct. 19, 2020

(87) PCT Pub. No.: WO2019/204791
PCT Pub. Date: Oct. 24, 2019

(65) Prior Publication Data
US 2021/0239345 A1 Aug. 5, 2021

Related U.S. Application Data

(60) Provisional application No. 62/664,040, filed on Apr. 27, 2018, provisional application No. 62/660,905, filed on Apr. 20, 2018.

(51) Int. Cl.
*F24F 11/39* (2018.01)
*B01D 46/00* (2022.01)
(Continued)

(52) U.S. Cl.
CPC .......... *F24F 11/39* (2018.01); *B01D 46/0086* (2013.01); *B01D 46/444* (2013.01);
(Continued)

(58) Field of Classification Search
None
See application file for complete search history.

(56) References Cited

U.S. PATENT DOCUMENTS 4,135,370 A 1/1979 Hosoda et al.
4,136,529 A 1/1979 McCarty
(Continued)

FOREIGN PATENT DOCUMENTS

CN 102019120 A 4/2011
CN 102353751 A 2/2012
(Continued)

OTHER PUBLICATIONS

"Clean Your Air with Keen Home Smart Filters", Keen Home, Inc., <https://keenhome.io/pages/smart-filter> 2018.
(Continued)

*Primary Examiner* — Jason M Greene
(74) *Attorney, Agent, or Firm* — Harness, Dickey & Pierce, P.L.C.

(57) ABSTRACT

A monitoring system for a heating, ventilation, and air conditioning (HVAC) system of a building is disclosed. The monitoring system includes at least one processor and a computer readable medium that includes instructions executable by the at least one processor. The instructions include: determining a capacity of a filter of the HVAC system based at least on dimensions of the filter; determining a threshold based on the capacity of the filter; monitoring a state of a circulator blower of the HVAC system; and calculating a filter usage based on the state of the circulator blower and one of (i) a power consumed by the circulator
(Continued)

blower and (ii) an operation mode of the HVAC system. The instructions also include generating, in response to the filter usage exceeding the threshold, an alert suggesting replacement of the filter.

20 Claims, 19 Drawing Sheets

(51) Int. Cl.
  *B01D 46/44* (2006.01)
  *B01D 46/46* (2006.01)
(52) U.S. Cl.
  CPC .......... *B01D 46/46* (2013.01); *B01D 2273/30* (2013.01); *B01D 2279/50* (2013.01)

(56) References Cited

U.S. PATENT DOCUMENTS

| | | | |
|---|---|---|---|
| 4,735,054 A | 4/1988 | Beckey | |
| 4,922,808 A | 5/1990 | Smith | |
| 4,977,818 A | 12/1990 | Taylor et al. | |
| 5,067,394 A | 11/1991 | Cavallero | |
| 5,129,234 A | 7/1992 | Alford | |
| 5,259,553 A | 11/1993 | Shyu | |
| 5,267,897 A | 12/1993 | Drees | |
| 5,303,561 A | 4/1994 | Bahel et al. | |
| 5,351,855 A | 10/1994 | Nelson et al. | |
| 5,394,934 A | 3/1995 | Rein et al. | |
| 5,428,964 A | 7/1995 | Lobdell | |
| 5,598,715 A | 2/1997 | Edmisten | |
| 5,707,005 A | 1/1998 | Kettler et al. | |
| 5,832,411 A | 11/1998 | Schatzmann et al. | |
| 5,887,784 A | 3/1999 | Haas | |
| 5,892,690 A | 4/1999 | Boatman et al. | |
| 5,904,896 A | 5/1999 | High | |
| 6,161,764 A | 12/2000 | Jatnieks | |
| 6,187,263 B1 | 2/2001 | Nielsen | |
| 6,230,980 B1 | 5/2001 | Hudson | |
| 6,251,344 B1 | 6/2001 | Goldstein | |
| 6,288,646 B1 | 9/2001 | Skardon | |
| 6,358,374 B1 | 3/2002 | Obee et al. | |
| 6,369,716 B1 | 4/2002 | Abbas et al. | |
| 6,377,858 B1 | 4/2002 | Koeppe | |
| 6,391,102 B1 | 5/2002 | Bodden et al. | |
| 6,392,536 B1 | 5/2002 | Tice et al. | |
| 6,394,427 B1 | 5/2002 | Guetersloh et al. | |
| 6,406,367 B1 | 6/2002 | Chou et al. | |
| 6,406,506 B1 | 6/2002 | Moredock et al. | |
| 6,423,118 B1 | 7/2002 | Becerra et al. | |
| 6,448,896 B1 | 9/2002 | Bankus et al. | |
| 6,466,133 B1 | 10/2002 | Skardon | |
| 6,493,638 B1 | 12/2002 | McLean et al. | |
| 6,494,053 B1 | 12/2002 | Forkosh et al. | |
| 6,494,940 B1 | 12/2002 | Hak | |
| 6,503,462 B1 | 1/2003 | Michalakos et al. | |
| 6,557,365 B2 | 5/2003 | Dinnage et al. | |
| 6,578,770 B1 | 6/2003 | Rosen | |
| 6,582,295 B1 | 6/2003 | Abouchaar | |
| 6,588,250 B2 | 7/2003 | Schell | |
| 6,622,993 B2 | 9/2003 | Mulvaney | |
| 6,691,526 B2 | 2/2004 | Gether et al. | |
| 6,698,219 B2 | 3/2004 | Sekhar et al. | |
| 6,711,470 B1 | 3/2004 | Hartenstein et al. | |
| 6,752,713 B2 | 6/2004 | Johnson, Jr. | |
| 6,790,136 B2 | 9/2004 | Sharp et al. | |
| 6,826,920 B2 | 12/2004 | Wacker | |
| 6,843,068 B1 | 1/2005 | Wacker | |
| 6,848,266 B1 | 2/2005 | Sheehan | |
| 6,884,399 B2 | 4/2005 | Reisfeld et al. | |
| 6,898,960 B1 | 5/2005 | Bodnar | |
| 6,902,592 B2 | 6/2005 | Green et al. | |
| 6,916,239 B2 | 7/2005 | Siddaramanna et al. | |
| 6,919,809 B2 | 7/2005 | Blunn et al. | |
| 6,920,874 B1 | 7/2005 | Siegel | |
| 6,924,326 B2 | 8/2005 | Meyer et al. | |
| 6,926,079 B2 | 8/2005 | Kensok et al. | |
| 6,941,193 B2 | 9/2005 | Frecska et al. | |
| 6,952,715 B1 | 10/2005 | Kronz | |
| 7,016,791 B2 | 3/2006 | Carnegie et al. | |
| 7,048,776 B2 | 5/2006 | Moore et al. | |
| 7,059,400 B2 | 6/2006 | Sekhar et al. | |
| 7,114,343 B2 | 10/2006 | Kates | |
| 7,151,264 B2 | 12/2006 | Ehlers, Sr. | |
| 7,178,350 B2 | 2/2007 | Shah | |
| 7,186,290 B2 | 3/2007 | Sheehan et al. | |
| 7,222,494 B2 | 5/2007 | Peterson et al. | |
| 7,241,326 B2 | 7/2007 | Han et al. | |
| 7,253,743 B2 | 8/2007 | Liang et al. | |
| 7,255,831 B2 | 8/2007 | Wei et al. | |
| 7,261,762 B2 | 8/2007 | Kang et al. | |
| 7,266,960 B2 | 9/2007 | Shah | |
| 7,267,017 B1 | 9/2007 | Bodnar | |
| RE39,871 E | 10/2007 | Skardon | |
| 7,291,206 B1 | 11/2007 | Kiern et al. | |
| 7,291,315 B2 | 11/2007 | Obee et al. | |
| 7,302,313 B2 | 11/2007 | Sharp et al. | |
| 7,306,650 B2 | 12/2007 | Slayzak et al. | |
| 7,325,748 B2 | 2/2008 | Acker, Jr. | |
| 7,326,388 B2 | 2/2008 | Uslenghi et al. | |
| 7,357,828 B2 | 4/2008 | Bohlen | |
| 7,366,588 B2 | 4/2008 | Kim et al. | |
| 7,368,003 B2 | 5/2008 | Crapser et al. | |
| 7,369,955 B2 | 5/2008 | Lee | |
| 7,378,064 B2 | 5/2008 | Uslenghi et al. | |
| 7,381,244 B2 | 6/2008 | Tyndall et al. | |
| 7,389,158 B2 | 6/2008 | Desrochers et al. | |
| 7,398,821 B2 | 7/2008 | Rainer et al. | |
| 7,407,624 B2 | 8/2008 | Cumberland et al. | |
| 7,413,594 B2 | 8/2008 | Paterson et al. | |
| 7,434,413 B2 | 10/2008 | Wruck | |
| 7,475,828 B2 | 1/2009 | Bartlett et al. | |
| 7,552,030 B2 | 6/2009 | Guralnik et al. | |
| 7,552,635 B2 | 6/2009 | Chang et al. | |
| 7,574,871 B2 | 8/2009 | Bloemer et al. | |
| 7,621,985 B1 | 11/2009 | Kuo | |
| 7,632,178 B2 | 12/2009 | Meneely, Jr. | |
| 7,632,340 B2 | 12/2009 | Brady et al. | |
| 7,635,845 B2 | 12/2009 | Jensen et al. | |
| 7,645,323 B2 | 1/2010 | Massenbauer-Strafe et al. | |
| 7,651,256 B2 | 1/2010 | Lee et al. | |
| 7,721,560 B2 | 5/2010 | Carpenter | |
| 7,740,184 B2 | 6/2010 | Schnell et al. | |
| 7,748,639 B2 | 7/2010 | Perry | |
| 7,758,408 B2 | 7/2010 | Hagentoft | |
| 7,765,792 B2 | 8/2010 | Rhodes et al. | |
| 7,780,092 B2 | 8/2010 | Ahmed | |
| 7,789,951 B2 | 9/2010 | Sung et al. | |
| 7,811,363 B2 | 10/2010 | Zhang | |
| 7,836,712 B2 | 11/2010 | Sasao et al. | |
| 7,837,958 B2 | 11/2010 | Crapser et al. | |
| 7,839,275 B2 | 11/2010 | Spalink et al. | |
| 7,857,884 B2 | 12/2010 | Bohlen | |
| 7,857,890 B2 | 12/2010 | Paterson et al. | |
| 7,918,407 B2 | 4/2011 | Patch | |
| 7,932,490 B2 | 4/2011 | Wang et al. | |
| 7,938,896 B2 | 5/2011 | Paterson et al. | |
| 7,951,327 B2 | 5/2011 | Reisfeld et al. | |
| 7,966,104 B2 | 6/2011 | Srivastava et al. | |
| 7,979,163 B2 | 7/2011 | Terlson et al. | |
| 8,024,982 B2 | 9/2011 | Pettit et al. | |
| 8,024,986 B2 | 9/2011 | Pettit et al. | |
| 8,066,558 B2 | 11/2011 | Thomle et al. | |
| 8,079,575 B2 | 12/2011 | Novotny et al. | |
| 8,083,398 B2 | 12/2011 | Doll | |
| 8,086,407 B2 | 12/2011 | Chan et al. | |
| 8,097,067 B2 | 1/2012 | Fox et al. | |
| 8,118,236 B2 | 2/2012 | Lestage et al. | |
| 8,147,302 B2 | 4/2012 | Desrochers et al. | |
| 8,172,154 B1 | 5/2012 | Figley et al. | |
| 8,190,367 B2 | 5/2012 | Bassa | |
| 8,219,249 B2 | 7/2012 | Harrod et al. | |
| 8,231,112 B2 | 7/2012 | Cao et al. | |
| 8,231,716 B2 | 7/2012 | Poon | |

(56) References Cited

U.S. PATENT DOCUMENTS

| | | |
|---|---|---|
| 8,239,066 B2 | 8/2012 | Jennings et al. |
| 8,267,164 B2 | 9/2012 | Lestage et al. |
| 8,292,270 B2 | 10/2012 | Terlson et al. |
| 8,318,084 B2 | 11/2012 | Johnson et al. |
| 8,328,910 B2 | 12/2012 | Mulholland |
| 8,333,816 B2 | 12/2012 | Kummer et al. |
| 8,335,593 B2 | 12/2012 | Johnson et al. |
| 8,347,643 B2 | 1/2013 | Taras et al. |
| 8,392,025 B2 | 3/2013 | Orfield |
| 8,397,522 B2 | 3/2013 | Springer et al. |
| 8,398,917 B2 | 3/2013 | Itzhak et al. |
| 8,398,923 B2 | 3/2013 | Mole |
| 8,402,815 B2 | 3/2013 | Marra |
| 8,423,192 B2 | 4/2013 | Liu |
| 8,428,901 B2 | 4/2013 | Hsieh |
| 8,442,694 B2 | 5/2013 | Jang |
| 8,467,977 B2 | 6/2013 | Xia et al. |
| 8,473,429 B2 | 6/2013 | Cheng et al. |
| 8,479,560 B2 | 7/2013 | Cobianu et al. |
| 8,492,722 B2 | 7/2013 | Chang et al. |
| 8,496,514 B2 | 7/2013 | Kim et al. |
| 8,496,735 B2 | 7/2013 | Jones et al. |
| 8,529,830 B2 | 9/2013 | Zhou et al. |
| 8,544,288 B2 | 10/2013 | MacDonald |
| 8,554,375 B2 | 10/2013 | Nerling |
| 8,555,662 B2 | 10/2013 | Peterson et al. |
| 8,560,126 B2 | 10/2013 | Vass et al. |
| 8,567,204 B2 | 10/2013 | Seem |
| 8,574,343 B2 | 11/2013 | Bisson et al. |
| 8,615,327 B2 | 12/2013 | Takagi et al. |
| 8,640,970 B2 | 2/2014 | Dorendorf |
| 8,651,391 B2 | 2/2014 | Patch |
| 8,683,845 B2 | 4/2014 | Fleischer et al. |
| 8,689,572 B2 | 4/2014 | Evans et al. |
| 8,691,144 B2 | 4/2014 | Garfield et al. |
| 8,696,800 B2 | 4/2014 | Storm |
| 8,700,227 B2 | 4/2014 | Vass et al. |
| 8,726,721 B2 | 5/2014 | Minges |
| 8,734,565 B2 | 5/2014 | Hoglund et al. |
| 8,744,629 B2 | 6/2014 | Wallaert et al. |
| 8,755,942 B2 | 6/2014 | Bonilla et al. |
| 8,757,154 B2 | 6/2014 | Schuller |
| 8,758,262 B2 | 6/2014 | Rhee et al. |
| 8,761,945 B2 | 6/2014 | Hadzidedic |
| 8,768,521 B2 | 7/2014 | Amundson et al. |
| 8,797,159 B2 | 8/2014 | Kirkpatrick et al. |
| 8,813,583 B2 | 8/2014 | Kilps et al. |
| 8,838,037 B2 | 9/2014 | Niederberger et al. |
| 8,852,501 B2 | 10/2014 | Hedman |
| 8,860,569 B2 | 10/2014 | Hruska et al. |
| 8,880,224 B2 | 11/2014 | Eaton et al. |
| 8,883,083 B2 | 11/2014 | Law et al. |
| 8,886,785 B2 | 11/2014 | Apte et al. |
| 8,889,079 B2 | 11/2014 | Zahedi |
| 8,892,797 B2 | 11/2014 | Grohman |
| 8,899,055 B2 | 12/2014 | Kuenzel et al. |
| 8,900,518 B2 | 12/2014 | Seck |
| 8,907,803 B2 | 12/2014 | Martin |
| 8,920,537 B2 | 12/2014 | Seike |
| 8,922,971 B2 | 12/2014 | Abate et al. |
| 8,930,030 B2 | 1/2015 | Bester et al. |
| 8,955,761 B2 | 2/2015 | Malloy |
| 8,958,918 B2 | 2/2015 | Voysey |
| 8,961,881 B2 | 2/2015 | Hagh et al. |
| 8,963,728 B2 | 2/2015 | Kates |
| 8,973,845 B2 | 3/2015 | Kanaya et al. |
| 8,978,445 B2 | 3/2015 | Bergsten |
| 8,986,427 B2 | 3/2015 | Hauville et al. |
| 9,010,172 B2 | 4/2015 | Xia et al. |
| 9,019,111 B1 | 4/2015 | Sloo et al. |
| 9,023,304 B2 | 5/2015 | Nikles |
| 9,040,007 B2 | 5/2015 | Hui et al. |
| 9,040,008 B2 | 5/2015 | Zahedi |
| 9,061,230 B2 | 6/2015 | Barakat |
| 9,073,009 B2 | 7/2015 | Vanderspurt et al. |
| 9,078,082 B2 | 7/2015 | Gill et al. |
| 9,080,784 B2 | 7/2015 | Dean-Hendricks et al. |
| 9,091,497 B2 | 7/2015 | Schwendinger et al. |
| 9,092,040 B2 | 7/2015 | Fadell et al. |
| 9,095,636 B2 | 8/2015 | Schmidt et al. |
| 9,097,432 B2 | 8/2015 | Kreft et al. |
| 9,101,904 B2 | 8/2015 | Yates et al. |
| 9,103,557 B2 | 8/2015 | Choi et al. |
| 9,109,981 B2 | 8/2015 | Sharp |
| 9,109,989 B2 | 8/2015 | Hamann et al. |
| 9,121,618 B2 | 9/2015 | Fisher et al. |
| 9,121,837 B2 | 9/2015 | Chan et al. |
| 9,143,344 B2 | 9/2015 | Cho et al. |
| 9,157,647 B2 | 10/2015 | Leen et al. |
| 9,164,519 B2 | 10/2015 | Holloway |
| 9,166,992 B1 | 10/2015 | Stickle et al. |
| 9,175,872 B2 | 11/2015 | Mckie et al. |
| 9,182,751 B1 | 11/2015 | Reeder |
| 9,186,609 B2 | 11/2015 | Sherman, III et al. |
| 9,200,804 B2 | 12/2015 | Park et al. |
| 9,208,676 B2 | 12/2015 | Fadell et al. |
| 9,234,667 B2 | 1/2016 | Ito et al. |
| 9,250,633 B2 | 2/2016 | Chen et al. |
| 9,254,459 B2 | 2/2016 | Miller |
| 9,261,290 B2 | 2/2016 | Storm |
| 9,278,304 B2 | 3/2016 | Lee |
| 9,280,884 B1 | 3/2016 | Schultz et al. |
| 9,286,779 B2 | 3/2016 | Shaw et al. |
| 9,304,511 B2 | 4/2016 | Blount et al. |
| 9,304,521 B2 | 4/2016 | Kates |
| 9,308,492 B2 | 4/2016 | Obee et al. |
| 9,310,088 B2 | 4/2016 | Melikov et al. |
| 9,311,807 B2 | 4/2016 | Schultz et al. |
| 9,316,410 B2 | 4/2016 | Meirav et al. |
| 9,317,659 B2 | 4/2016 | Balinski et al. |
| 9,323,895 B2 | 4/2016 | Balinski et al. |
| 9,325,516 B2 | 4/2016 | Pera et al. |
| 9,328,936 B2 | 5/2016 | Meirav et al. |
| 9,332,322 B2 | 5/2016 | Niemeyer et al. |
| 9,344,753 B2 | 5/2016 | Yerli |
| 9,347,678 B2 | 5/2016 | Stakutis et al. |
| 9,347,860 B1 | 5/2016 | Lalain et al. |
| 9,347,925 B2 | 5/2016 | Shen et al. |
| 9,353,964 B2 | 5/2016 | Kates |
| 9,353,966 B2 | 5/2016 | Finkam |
| 9,360,229 B2 | 6/2016 | Modi et al. |
| 9,366,448 B2 | 6/2016 | Dean-Hendricks et al. |
| 9,372,010 B2 | 6/2016 | Jung et al. |
| 9,375,672 B2 | 6/2016 | Meirav et al. |
| 9,377,768 B2 | 6/2016 | Grohman |
| 9,390,388 B2 | 7/2016 | Drees et al. |
| 9,395,096 B2 | 7/2016 | Fisher et al. |
| 9,399,187 B2 | 7/2016 | Meirav et al. |
| 9,400,119 B2 | 7/2016 | Malloy |
| 9,404,666 B2 | 8/2016 | Terlson et al. |
| 9,405,301 B2 | 8/2016 | Montero et al. |
| 9,410,752 B2 | 8/2016 | Wallace |
| 9,416,987 B2 | 8/2016 | Ragland et al. |
| 9,417,005 B1 | 8/2016 | Roth et al. |
| 9,417,637 B2 | 8/2016 | Matsuoka et al. |
| 9,423,144 B2 | 8/2016 | Evans et al. |
| 9,423,146 B2 | 8/2016 | Bruce et al. |
| 9,427,728 B2 | 8/2016 | Sidheswaran et al. |
| 9,449,491 B2 | 9/2016 | Sager et al. |
| 9,459,606 B2 | 10/2016 | Takayama et al. |
| 9,463,339 B2 | 10/2016 | Nozaki |
| 9,464,818 B2 | 10/2016 | Holm et al. |
| 9,498,555 B2 | 11/2016 | Hingorani et al. |
| 9,520,250 B2 | 12/2016 | O'Keeffe |
| 9,522,210 B2 | 12/2016 | Worrilow |
| 9,523,665 B2 | 12/2016 | Fleischer et al. |
| 9,535,407 B2 | 1/2017 | Durham et al. |
| 9,537,670 B2 | 1/2017 | Cho et al. |
| 9,557,069 B2 | 1/2017 | Matsui et al. |
| 9,568,445 B2 | 2/2017 | Klein et al. |
| 9,593,859 B2 | 3/2017 | Niazi |
| 9,593,861 B1 | 3/2017 | Burnett |
| 9,597,627 B2 | 3/2017 | Zhang |
| 9,599,353 B2 | 3/2017 | Cur et al. |

(56) References Cited

U.S. PATENT DOCUMENTS

| | | |
|---|---|---|
| 9,599,357 B2 | 3/2017 | Vogel |
| 9,612,188 B2 | 4/2017 | Johnston et al. |
| 9,618,224 B2 | 4/2017 | Emmons et al. |
| 9,638,434 B2 | 5/2017 | Alston |
| 9,638,436 B2 | 5/2017 | Arensmeier et al. |
| 9,643,117 B2 | 5/2017 | Rahlin et al. |
| 9,645,112 B2 | 5/2017 | Chan |
| 9,677,777 B2 | 6/2017 | Karamanos et al. |
| 9,694,309 B2 | 7/2017 | Weatherman et al. |
| 9,696,049 B2 | 7/2017 | Metteer |
| 9,696,735 B2 | 7/2017 | Matsuoka et al. |
| 9,709,291 B2 | 7/2017 | Dostmann |
| 9,714,844 B1 | 7/2017 | Stamatakis et al. |
| 9,715,242 B2 | 7/2017 | Pillai et al. |
| 9,723,380 B2 | 8/2017 | Patel et al. |
| 9,726,579 B2 | 8/2017 | Han et al. |
| 9,729,945 B2 | 8/2017 | Schultz et al. |
| 9,737,842 B2 | 8/2017 | Matlin et al. |
| 9,752,789 B2 | 9/2017 | Staniforth et al. |
| 9,759,437 B2 | 9/2017 | Kim et al. |
| 9,764,623 B2 | 9/2017 | Fruehsorger et al. |
| 9,789,436 B2 | 10/2017 | Meirav et al. |
| 9,797,620 B2 | 10/2017 | Matsugi et al. |
| 9,797,812 B2 | 10/2017 | Hamann et al. |
| 9,803,877 B2 | 10/2017 | Yun |
| 9,810,441 B2 | 11/2017 | Dean-Hendricks et al. |
| 9,816,724 B2 | 11/2017 | Phannavong et al. |
| 9,821,260 B2 | 11/2017 | Stoner, Jr. et al. |
| 9,833,734 B2 | 12/2017 | Fox et al. |
| 9,835,348 B2 | 12/2017 | Storm et al. |
| 9,839,872 B2 | 12/2017 | Spartz |
| 9,851,299 B2 | 12/2017 | Bertaux |
| 9,854,335 B2 | 12/2017 | Patel et al. |
| 9,856,883 B1 | 1/2018 | Olsen |
| 9,857,301 B1 | 1/2018 | Nourbakhsh et al. |
| 9,890,969 B2 | 2/2018 | Martin |
| 9,986,313 B2 | 5/2018 | Schwarzkopf et al. |
| 9,990,842 B2 | 6/2018 | Zribi et al. |
| 10,976,065 B2 | 4/2021 | Kohn et al. |
| 11,371,726 B2 | 6/2022 | Pham et al. |
| 11,543,147 B2 | 1/2023 | Rite |
| 2001/0045159 A1* | 11/2001 | Johnson .............. B01D 46/0086 95/26 |
| 2003/0070544 A1 | 4/2003 | Mulvaney et al. |
| 2004/0006886 A1 | 1/2004 | Lee et al. |
| 2004/0109800 A1 | 6/2004 | Pahlman et al. |
| 2005/0098495 A1 | 5/2005 | Hughes |
| 2005/0277381 A1 | 12/2005 | Banerjee et al. |
| 2006/0055547 A1 | 3/2006 | DiMaggio |
| 2006/0267756 A1 | 11/2006 | Kates |
| 2007/0013534 A1 | 1/2007 | DiMaggio |
| 2007/0082601 A1 | 4/2007 | Desrochers et al. |
| 2007/0155305 A1 | 7/2007 | Heidel et al. |
| 2008/0014857 A1 | 1/2008 | Spadafora et al. |
| 2008/0022705 A1 | 1/2008 | Clearman |
| 2008/0182506 A1 | 7/2008 | Jackson et al. |
| 2009/0079098 A1 | 3/2009 | Ezra |
| 2009/0126382 A1 | 5/2009 | Rubino et al. |
| 2009/0179338 A1 | 7/2009 | Cottier |
| 2009/0204262 A1 | 8/2009 | Nishimura |
| 2011/0010071 A1 | 1/2011 | Rhodes et al. |
| 2011/0052453 A1 | 3/2011 | McLarnon et al. |
| 2011/0125044 A1 | 5/2011 | Rhee et al. |
| 2011/0151766 A1 | 6/2011 | Sherman et al. |
| 2011/0184250 A1 | 7/2011 | Schmidt et al. |
| 2012/0095684 A1 | 4/2012 | Chan et al. |
| 2012/0323374 A1* | 12/2012 | Dean-Hendricks ...... F24F 11/39 700/276 |
| 2013/0014522 A1 | 1/2013 | Lukasse et al. |
| 2013/0144527 A1 | 6/2013 | Kuhnreichi |
| 2013/0226352 A1 | 8/2013 | Dean-Hendricks et al. |
| 2013/0287626 A1 | 10/2013 | Benedek et al. |
| 2013/0289778 A1 | 10/2013 | Ishizaka |
| 2013/0323781 A1 | 12/2013 | Moularat et al. |
| 2013/0344609 A1 | 12/2013 | Mayer et al. |
| 2014/0020559 A1 | 1/2014 | Meirav et al. |
| 2014/0053586 A1 | 2/2014 | Poecher et al. |
| 2014/0079564 A1 | 3/2014 | Becerra et al. |
| 2014/0083292 A1 | 3/2014 | Weiden |
| 2014/0109649 A1 | 4/2014 | Fleischer et al. |
| 2014/0129004 A1 | 5/2014 | Takayama et al. |
| 2014/0139342 A1 | 5/2014 | Brown |
| 2014/0190679 A1 | 7/2014 | Roosli et al. |
| 2014/0207693 A1 | 7/2014 | Horst et al. |
| 2014/0217185 A1 | 8/2014 | Bicknell |
| 2014/0241970 A1 | 8/2014 | Smyrniotis et al. |
| 2014/0244043 A1 | 8/2014 | Foster |
| 2014/0262837 A1 | 9/2014 | Sidheswaran et al. |
| 2014/0266755 A1 | 9/2014 | Arensmeier et al. |
| 2014/0313048 A1 | 10/2014 | Sabata et al. |
| 2014/0346237 A1 | 11/2014 | Mirza et al. |
| 2014/0354976 A1 | 12/2014 | Evenstad et al. |
| 2014/0365017 A1 | 12/2014 | Hanna et al. |
| 2014/0370800 A1 | 12/2014 | Ansari |
| 2015/0011154 A1 | 1/2015 | Holm et al. |
| 2015/0032264 A1 | 1/2015 | Emmons et al. |
| 2015/0046179 A1 | 2/2015 | Kang |
| 2015/0050876 A1 | 2/2015 | Sakai et al. |
| 2015/0052975 A1 | 2/2015 | Martin |
| 2015/0077737 A1 | 3/2015 | Belinsky et al. |
| 2015/0088786 A1 | 3/2015 | Anandhakrishnan |
| 2015/0140919 A1 | 5/2015 | Zwijack |
| 2015/0153061 A1 | 6/2015 | Riberon et al. |
| 2015/0153317 A1 | 6/2015 | Krebs |
| 2015/0168003 A1 | 6/2015 | Stefanski et al. |
| 2015/0168964 A1 | 6/2015 | Wu et al. |
| 2015/0202563 A1 | 7/2015 | Spartz |
| 2015/0241318 A1 | 8/2015 | Hamann et al. |
| 2015/0246150 A1 | 9/2015 | De Koster et al. |
| 2015/0256355 A1 | 9/2015 | Pera et al. |
| 2015/0285524 A1 | 10/2015 | Saunders |
| 2015/0285755 A1 | 10/2015 | Moss et al. |
| 2015/0289802 A1 | 10/2015 | Thomas et al. |
| 2015/0298043 A1 | 10/2015 | Meirav et al. |
| 2015/0301513 A1 | 10/2015 | Sager et al. |
| 2015/0306271 A1 | 10/2015 | Willette |
| 2015/0323206 A1 | 11/2015 | Chan et al. |
| 2015/0323427 A1 | 11/2015 | Sharp |
| 2015/0330650 A1 | 11/2015 | Abiprojo et al. |
| 2015/0330817 A1 | 11/2015 | Law et al. |
| 2015/0330861 A1* | 11/2015 | Alsaleem ................ F24F 11/39 702/183 |
| 2015/0335834 A1 | 11/2015 | Anandhakrishnan |
| 2015/0347910 A1 | 11/2015 | Fadell et al. |
| 2015/0348400 A1 | 12/2015 | Zribi et al. |
| 2015/0354848 A1 | 12/2015 | Abel et al. |
| 2015/0369503 A1 | 12/2015 | Flaherty et al. |
| 2015/0369507 A1 | 12/2015 | Flaherty et al. |
| 2015/0370986 A1 | 12/2015 | Hayward |
| 2015/0375187 A1 | 12/2015 | Yates et al. |
| 2016/0015277 A1 | 1/2016 | Dumoulin et al. |
| 2016/0015278 A1 | 1/2016 | Campo et al. |
| 2016/0015314 A1 | 1/2016 | Dusanter et al. |
| 2016/0015315 A1 | 1/2016 | Auphan et al. |
| 2016/0026201 A1 | 1/2016 | Vellanki et al. |
| 2016/0029805 A1 | 2/2016 | Arens et al. |
| 2016/0041074 A1 | 2/2016 | Pliskin |
| 2016/0048143 A1 | 2/2016 | Chan et al. |
| 2016/0054023 A1 | 2/2016 | Baker et al. |
| 2016/0061472 A1 | 3/2016 | Lee et al. |
| 2016/0061794 A1 | 3/2016 | Schultz et al. |
| 2016/0078751 A1 | 3/2016 | Sloo et al. |
| 2016/0088438 A1 | 3/2016 | O'Keeffe |
| 2016/0089089 A1 | 3/2016 | Kakkar et al. |
| 2016/0091216 A1 | 3/2016 | Tran et al. |
| 2016/0107114 A1 | 4/2016 | Fu et al. |
| 2016/0110782 A1 | 4/2016 | Tadajewski |
| 2016/0116181 A1 | 4/2016 | Aultman et al. |
| 2016/0125714 A1 | 5/2016 | Kates et al. |
| 2016/0132031 A1 | 5/2016 | Kozura et al. |
| 2016/0133108 A1 | 5/2016 | Bucsa et al. |
| 2016/0139038 A1 | 5/2016 | Oldsen et al. |
| 2016/0147506 A1 | 5/2016 | Britt et al. |
| 2016/0153674 A1 | 6/2016 | Lancaster |

(56) References Cited

U.S. PATENT DOCUMENTS

| | | |
|---|---|---|
| 2016/0153884 A1 | 6/2016 | Han et al. |
| 2016/0161137 A1 | 6/2016 | Chen et al. |
| 2016/0169544 A1 | 6/2016 | Fischer et al. |
| 2016/0169545 A1 | 6/2016 | Mangsuli et al. |
| 2016/0178586 A1 | 6/2016 | Stark |
| 2016/0209065 A1 | 7/2016 | Hagstrom et al. |
| 2016/0209070 A1 | 7/2016 | Hrejsa et al. |
| 2016/0209316 A1 | 7/2016 | Buseyne et al. |
| 2016/0228809 A1 | 8/2016 | Meirav et al. |
| 2016/0228811 A1 | 8/2016 | Meirav et al. |
| 2016/0231014 A1 | 8/2016 | Ro et al. |
| 2016/0238527 A1 | 8/2016 | Tseng et al. |
| 2016/0245784 A1 | 8/2016 | Matocha et al. |
| 2016/0256590 A1 | 9/2016 | Taghipour |
| 2016/0263263 A1 | 9/2016 | Robert |
| 2016/0263268 A1 | 9/2016 | Kirschman |
| 2016/0292781 A1 | 10/2016 | Nahmad et al. |
| 2016/0313290 A1 | 10/2016 | Forzani et al. |
| 2016/0332170 A1 | 11/2016 | Wennerstrom |
| 2016/0334121 A1 | 11/2016 | Oobayashi |
| 2016/0348938 A1 | 12/2016 | Simon et al. |
| 2016/0356511 A1 | 12/2016 | Messinger et al. |
| 2016/0363332 A1 | 12/2016 | Blackley |
| 2016/0363339 A1 | 12/2016 | Blackley |
| 2016/0370021 A1 | 12/2016 | Wiley et al. |
| 2016/0370029 A1 | 12/2016 | Kurelowech |
| 2016/0377305 A1 | 12/2016 | Kwa |
| 2017/0007954 A1 | 1/2017 | Ehdaie |
| 2017/0010006 A1 | 1/2017 | Kim et al. |
| 2017/0021298 A1 | 1/2017 | Williams et al. |
| 2017/0080373 A1 | 3/2017 | Engelhard |
| 2017/0089810 A1 | 3/2017 | Novaro |
| 2017/0095762 A1 | 4/2017 | Wolowicz |
| 2017/0097165 A1 | 4/2017 | Yasuda et al. |
| 2017/0098230 A1 | 4/2017 | Orangkhadivi |
| 2017/0108231 A1 | 4/2017 | Hasegawa et al. |
| 2017/0130981 A1 | 5/2017 | Willette et al. |
| 2017/0159964 A1 | 6/2017 | Arai et al. |
| 2017/0167743 A1 | 6/2017 | Dempsey et al. |
| 2017/0189844 A1 | 7/2017 | McLeod et al. |
| 2017/0193788 A1 | 7/2017 | Kim et al. |
| 2017/0193792 A1 | 7/2017 | Bermudez Rodriguez et al. |
| 2017/0234570 A1 | 8/2017 | Livchak et al. |
| 2017/0248332 A1 | 8/2017 | Wright et al. |
| 2017/0268797 A1 | 9/2017 | Mowris et al. |
| 2017/0273256 A1 | 9/2017 | Hutzel |
| 2017/0273845 A1 | 9/2017 | Phillips et al. |
| 2017/0292432 A1 | 10/2017 | Hall et al. |
| 2017/0314812 A1 | 11/2017 | Hurley |
| 2017/0323550 A1 | 11/2017 | Patil et al. |
| 2017/0328591 A1 | 11/2017 | Kelly et al. |
| 2017/0333838 A1 | 11/2017 | Bender et al. |
| 2017/0341001 A1 | 11/2017 | Jousma et al. |
| 2017/0341002 A1 | 11/2017 | Cama et al. |
| 2017/0343227 A1 | 11/2017 | Mowris |
| 2017/0347499 A1 | 11/2017 | Ross et al. |
| 2017/0350610 A1 | 12/2017 | Michielsen et al. |
| 2017/0350611 A1 | 12/2017 | Su et al. |
| 2017/0356670 A1 | 12/2017 | Zhang et al. |
| 2017/0368488 A1 | 12/2017 | Wall |
| 2018/0001249 A1 | 1/2018 | Sher |
| 2018/0017275 A1 | 1/2018 | Merrill |
| 2018/0017278 A1 | 1/2018 | Klein et al. |
| 2018/0017513 A1 | 1/2018 | Le Neel et al. |
| 2018/0017536 A1 | 1/2018 | Le Neel et al. |
| 2018/0021613 A1 | 1/2018 | Li |
| 2018/0023831 A1 | 1/2018 | Ha et al. |
| 2018/0023834 A1 | 1/2018 | Hatch et al. |
| 2018/0050302 A1 | 2/2018 | Kamiyama et al. |
| 2018/0073759 A1 | 3/2018 | Zhang et al. |
| 2018/0119974 A1 | 5/2018 | Kotake et al. |
| 2018/0135877 A1 | 5/2018 | Seiler |
| 2018/0148180 A1 | 5/2018 | Fagundes et al. |
| 2019/0023099 A1 | 1/2019 | Li et al. |
| 2021/0041119 A1 | 2/2021 | Pham et al. |
| 2023/0070313 A1 | 3/2023 | Douglas et al. |

FOREIGN PATENT DOCUMENTS

| | | |
|---|---|---|
| CN | 102393882 A | 3/2012 |
| CN | 202792383 U | 3/2013 |
| CN | 203090662 U | 7/2013 |
| CN | 104089361 A | 10/2014 |
| CN | 203949322 U | 11/2014 |
| CN | 104359815 A | 2/2015 |
| CN | 104534617 A | 4/2015 |
| CN | 103958976 B | 11/2016 |
| CN | 106196506 A | 12/2016 |
| CN | 107676931 A | 2/2018 |
| CN | 107940682 A | 4/2018 |
| DE | 10108274 A1 | 9/2002 |
| EP | 0893657 A1 | 1/1999 |
| EP | 1402935 A1 | 3/2004 |
| EP | 1904905 A2 | 4/2008 |
| EP | 2450640 A2 | 5/2012 |
| EP | 2134556 B1 | 7/2012 |
| EP | 2368616 B1 | 12/2012 |
| EP | 2564114 A1 | 3/2013 |
| EP | 2713159 A2 | 4/2014 |
| EP | 2891019 A1 | 7/2015 |
| EP | 2937961 A1 | 10/2015 |
| EP | 3040948 A1 | 7/2016 |
| EP | 3073883 A1 | 10/2016 |
| EP | 3121524 A1 | 1/2017 |
| JP | H05180487 A | 7/1993 |
| JP | 09-280640 | 10/1997 |
| JP | 2007083106 A | 4/2007 |
| JP | 5231476 B2 | 7/2013 |
| JP | 2014208343 A | 11/2014 |
| JP | 2015152175 A | 8/2015 |
| KR | 100355352 B1 | 9/2002 |
| KR | 20030016787 A | 3/2003 |
| KR | 20040061677 A | 7/2004 |
| KR | 100509332 B1 | 8/2005 |
| KR | 20050120911 A | 12/2005 |
| KR | 20070072787 A | 7/2007 |
| KR | 100819077 B1 | 4/2008 |
| KR | 100930346 B1 | 12/2009 |
| KR | 20100089605 A | 8/2010 |
| KR | 20110074222 A | 6/2011 |
| KR | 20110093329 A | 8/2011 |
| KR | 101199180 B1 | 11/2012 |
| KR | 101566592 B1 | 11/2015 |
| KR | 101765454 B1 | 8/2017 |
| KR | 101771053 B1 | 8/2017 |
| KR | 20170122043 A | 11/2017 |
| KR | 20180007381 A | 1/2018 |
| LU | 92350 A1 | 7/2015 |
| WO | WO-9409324 A1 | 4/1994 |
| WO | WO-2005110580 A2 | 11/2005 |
| WO | WO-2013163612 A1 | 10/2013 |
| WO | WO-2015078672 A1 | 6/2015 |
| WO | WO-2016102337 A1 | 6/2016 |
| WO | WO-2016139544 A1 | 9/2016 |
| WO | WO-2017146637 A1 | 8/2017 |

OTHER PUBLICATIONS

"Home Comfort: Digital, App-Based Climate Control", Ecovent Systems Inc., <https://www.ecoventsystems.com/> 2018.

"Meet the Keen Home Zoning System—How It Works", Keen Home, Inc., <https://keenhome.io/pages/how-it-works> 2018.

Doty, Steve, et al., "Building Operations: Balancing Energy Efficiency with Indoor Air Quality", 2009.

El Mankibi, Mohamed, "Indoor air quality control in case of scheduled or intermittent occupancy based building: Development of a scale model", 2009.

Emmerich, Steven, et al., "Indoor air quality impacts of residential HVAC systems, phase 1 report: Computer simulation plan", NISTIR 5346: Building and Fire Research Laboratory; National Institute of

(56) References Cited

OTHER PUBLICATIONS

Standards and Technology: http://www.researchgate.net/profile/Steven_Emmerich/publication/236454476_Indoor_air_quality_impacts_of_residential_HVAC_systems_phase_1_report_Computer_simulation_plan/links/565f5f2308ae1ef929854780.pdf; Feb. 1994; 108 Pages.

Footbot; Product Specifications; www.footbot.io. Accessed Sep. 13, 2017.

Herberger, Simone, et al., "Indoor Air Quality Monitoring Improving Air Quality Perception", 2012.

International Search Report of the ISA/KR regarding International Application No. PCT/US2018/062190 dated Mar. 21, 2019.

Shaw, C. Y., "Maintaining acceptable air quality in office buildings through ventilation", Construction Technology Updated No. 3, Institute for Research in Construction, National Research Council of Canada, Jan. 1997; 4 Pages.

Turner, William J.N., et al., "Energy and IAQ implications of residential ventilation cooling", ResearchGate: http://www.researchgate.net/profile/William_Turner10/publication/278961832_Energy_and_IAQ_implications_of_residential_ventilation_cooling/links/5587e12608aef58c03a06547.pdf, Aug. 2014; 52 pages.

Written Opinion of the ISA/KR regarding International Application No. PCT/US2018/062190 dated Mar. 21, 2019.

Zhong, Lexuan, et al., "Ozonation Air Purification Technology in HVAC Applications", Concordia University: http://www.researchgate.net/profile/Lexuan_Zhong/publication/260363850_Ozonation_Air_Purification_Technology_in_HVAC_Applications/links/0a85e530e28d98ecf4000000, 2014; 8 Pages.

Non-Final Office Action regarding U.S. Appl. No. 17/078,031 dated Oct. 20, 2021.

U.S. Appl. No. 17/078,031, filed Oct. 22, 2020, Stuart K. Morgan.

U.S. Appl. No. 17/048,866, filed Oct. 19, 202, Hung M. Pham.

U.S. Appl. No. 17/048,910, filed Oct. 19, 2020, Hung M. Pham.

Non-Final Office Action for U.S. Appl. No. 17/048,866 dated Jul. 20, 2023.

Non-Final Office Action for U.S. Appl. No. 17/048,910 dated Jul. 27, 2023.

Notice of Allowance regarding U.S. Appl. No. 17/078,031 dated Feb. 22, 2022.

International Search Report of the ISA/KR regarding International Application No. PCT/US2019/028398 dated Aug. 6, 2019.

International Search Report of the ISA/KR regarding International Application No. PCT/US2019/028400 dated Aug. 9, 2019.

International Search Report of the ISA/KR regarding International Application No. PCT/US2019/028409 dated Aug. 9, 2019.

Written Opinion of the ISA/KR regarding International Application No. PCT/US2019/028398 dated Aug. 6, 2019.

Written Opinion of the ISA/KR regarding International Application No. PCT/US2019/028400 dated Aug. 9, 2019.

Written Opinion of the ISA/KR regarding International Application No. PCT/US2019/028409 dated Aug. 9, 2019.

\* cited by examiner

| Mode of Operation | Control Lines Activated | Control Line Current Level |
|---|---|---|
| Idle | None | 40 mA |
| Heating | W | 60 mA |
| Fan only | G | 110 mA |
| Heating plus Fan | W with G | 150 mA |
| Cooling | Y with G | 600 mA |

FIG. 4

HVAC FILTER USAGE ANALYSIS SYSTEM

CROSS-REFERENCE TO RELATED APPLICATIONS

This application is the U.S. National Phase Application under 35 U.S.C. 371 of International Application No. PCT/US2019/028409 filed on Apr. 19, 2019, which claims the benefit of U.S. Provisional Application No. 62/660,905, filed Apr. 20, 2018 and U.S. Provisional Application No. 62/664,040, filed Apr. 27, 2018. The entire disclosures of the applications referenced above are incorporated by reference.

FIELD

The present disclosure relates to environmental comfort systems and more particularly to monitoring of residential and light commercial environmental comfort systems.

BACKGROUND

A residential or light commercial HVAC (heating, ventilation, or air conditioning) system controls environmental parameters, such as temperature and humidity, of a building. The target values for the environmental parameters, such as a temperature setpoint, may be specified by a user or owner of the building, such as an employee working in the building or a homeowner.

In FIG. 1, a block diagram of an example HVAC system is presented. In this particular example, a forced air system with a gas furnace is shown. Return air is pulled from the building through a filter 104 by a circulator blower 108. The circulator blower 108, also referred to as a fan, is controlled by a control module 112. The control module 112 receives signals from a thermostat 116. For example only, the thermostat 116 may include one or more temperature setpoints specified by the user.

The thermostat 116 may direct that the circulator blower 108 be turned on at all times or only when a heat request or cool request is present (automatic fan mode). In various implementations, the circulator blower 108 can operate at one or more discrete speeds or at any speed within a predetermined range. For example, the control module 112 may actuate one or more switching relays (not shown) to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a temperature high enough that gas introduced to the heated surface will combust. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via convection. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an evaporator 144, and a condensate pan 146. In various implementations, the air handler unit 136 includes an electrical heating device (not shown) instead of, or in addition to, the burner 120. When used in addition to the burner 120, the electrical heating device may provide backup or secondary (extra) heat.

In FIG. 1, the HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold (generally, below the dew point of the air within the building), which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in an enclosure referred to as a condensing unit 164.

In various implementations, the control module 156 may include a run capacitor, a start capacitor, and a contactor or relay. In various implementations, the start capacitor may be omitted, such as when the condensing unit 164 includes a scroll compressor instead of a reciprocating compressor. The compressor 148 may be a variable-capacity compressor and may respond to a multiple-level cool request. For example, the cool request may indicate a mid-capacity call for cooling or a high-capacity call for greater cooling. The compressor 148 therefore varies its capacity according to the cool request.

The electrical lines provided to the condensing unit 164 may include a 240V mains power line (not shown) and a 24V switched control line. The 24V control line may correspond to the cool request shown in FIG. 1. The 24V control line controls operation of the contactor. When the control line indicates that the compressor should be on, the contactor contacts close, connecting the 240V power supply to the compressor 148. In addition, the contactor may connect the 240V power supply to the condenser fan 160. In various implementations, such as when the condensing unit 164 is located in the ground as part of a geothermal system, the condenser fan 160 may be omitted. When the 240V mains power supply arrives in two legs, as is common in the U.S., the contactor may have two sets of contacts, and can be referred to as a double-pole single-throw switch.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A monitoring system for monitoring a heating, ventilation, and air conditioning (HVAC) system of a building is disclosed. The monitoring system includes at least one processor and a computer-readable medium that includes instructions executable by the at least one processor. The instructions include: determining a capacity of a filter of the HVAC system based at least on dimensions of the filter; determining a threshold based on the capacity of the filter; monitoring a state of a circulator blower of the HVAC system; and calculating a filter usage based on the state of the circulator blower and one of (i) a current consumed by the circulator blower and (ii) an operation mode of the HVAC system. The instructions also include generating, in response to the filter usage exceeding the threshold, an alert suggesting replacement of the filter. In further features, the instructions include reporting the filter usage as a percentage.

In other features, the instructions include accumulating, in response to receiving a power signal indicative of the power consumed by the circulator blower, a cumulative power value based on the power signal. The instructions also include calculating the filter usage based on the power value.

In other features, the monitoring system includes a current sensor configured to measure a current indicative of the power consumed by the circulator blower. Calculating the filter usage includes periodically increasing the filter usage based on the measured current.

In further features, increasing the filter usage includes adding an average current consumed by the circulator blower calculated over a predetermined period of time to the filter usage. In other features, increasing the filter usage includes a stepwise increase for each increment of time in which the state of the circulator blower indicates that the circulator blower is running.

In yet other features, the instructions include determining, in response to the circulator blower being on, the operation mode of the HVAC system. Calculating the filter usage includes periodically increasing the filter usage based on the operation mode of the HVAC system. In further features, determining the operation mode of the HVAC system includes receiving power data associated with the HVAC system from an energy monitor that measures power consumed by all electrical appliances in the building and determining the operation mode of the HVAC based on the power data.

In other features, the instructions include adding, in response to determining the operation mode of the HVAC system is a cooling mode, a first period of time to the filter usage. In further features, the instructions include in response to determining the operation mode of the HVAC system is a second cooling mode, adding a product of the first period of time and a first adjustment factor to the filter usage and in response to determining the operation mode of the HVAC system is a heating mode, adding a product of the first period of time and a second adjustment factor to the filter usage. In yet further features, the instructions include in response to determining the operation mode of the HVAC system is a second heating mode, adding a product of the first period of time and a third adjustment factor to the filter usage and in response to determining the operation mode of the HVAC system is a fan only mode, adding a product of the first period of time and a fourth adjustment factor to the filter usage.

In other features, the instructions include determining a remaining life of the filter based on a length of time that the filter has been installed in the HVAC system, the filter usage, and the capacity of the filter. The alert suggesting replacement of the filter includes the remaining life of the filter.

In yet other features, the instructions include generating, in response to the filter usage equaling or exceeding the capacity of the filter, an alert indicating that the filter needs to be replaced.

In yet other features, generating the alert suggesting replacement of the filter includes generating the alert only once per predetermined period. The predetermined period is greater than or equal to one day.

A monitoring system for monitoring an HVAC system of a building is disclosed. The monitoring system includes at least one processor and a computer-readable medium that includes instructions executable by the at least one processor. The instructions include: determining a capacity of a filter of the HVAC system based at least on dimensions of the filter; determining a threshold based on the capacity of the filter; and calculating a filter usage based on a speed of a circulator blower of the HVAC system. The speed of the circulator blower is one of two non-zero speeds. The instructions further include generating, in response to the filter usage exceeding the threshold, an alert suggesting replacement of the filter.

In other features, the instructions further include measuring a current consumed by a motor of the circulator blower and determining the speed of the circulator blower based on the measured current.

In yet other features, the instructions further include measuring a power consumed by a motor of the circulator blower and determining the speed of the circulator blower based on the measured power.

In other features, the instructions further include receiving data from a thermostat of the HVAC system. The data includes an operation mode of the HVAC system. The instructions also include determining the speed of the circulator blower based on the operation mode.

In yet other features, the instructions further include receiving power data from an energy monitor of the building. The power data indicates an operation mode of the HVAC system. The instructions further include determining the speed of the circulator blower based on the operation mode indicted by the power data.

A method for monitoring an HVAC system of a building includes: determining a capacity of a filter of an HVAC system based at least on dimensions of the filter; determining a threshold based on the capacity of the filter; monitoring a state of a circulator blower of the HVAC system; and calculating a filter usage based on the state of the circulator blower and one of (i) a power consumed by the circulator blower and (ii) an operation mode of the HVAC system. The method also includes generating, in response to the filter usage exceeding the threshold, an alert suggesting replacement of the filter. In further features, the method includes reporting the filter usage as a percentage.

In other features, the method includes accumulating, in response to receiving a power signal indicative of the power consumed by the circulator blower, a cumulative power value based on the power signal. The method further includes calculating the filter usage based on the power value.

In other features, the method includes measuring current indicative of power consumed by the circulator blower using a current sensor and periodically increasing the filter usage based on the measured current. In further features, increasing the filter usage includes adding an average current consumed by the circulator blower calculated over a predetermined period of time to the filter usage.

In yet other features, increasing the filter usage includes a stepwise increase for each increment of time in which the state of the circulator blower indicates that the circulator blower is running.

In other features, the method includes determining, in response to the circulator blower being on, the operation mode of the HVAC system. Calculating the filter usage includes periodically increasing the filter usage based on the operation mode of the HVAC system.

In yet other features, the method includes receiving power data associated with the HVAC system from an energy monitor that measures power consumed by all electrical appliances in the building. The method further includes determining the operation mode of the HVAC based on the power data.

In other features, the method includes adding, in response to determining the operation mode of the HVAC system is a cooling mode, a first period of time to the filter usage. In further features, the method incudes in response to determining the operation mode of the HVAC system is a second cooling mode, adding a product of the first period of time and a first adjustment factor to the filter usage and in response to determining the operation mode of the HVAC system is a heating mode, adding a product of the first period of time and a second adjustment factor to the filter usage. In yet further features, the method includes in response to determining the operation mode of the HVAC system is a second heating mode, adding a product of the first period of time and a third adjustment factor to the filter usage and in response to determining the operation mode of the HVAC system is a fan only mode, adding a product of the first period of time and a fourth adjustment factor to the filter usage.

In other features, the method includes determining a remaining life of the filter based on a length of time that the filter has been installed in HVAC system, the filter usage, and the capacity of the filter. The alert suggesting replacement of the filter includes the remaining life of the filter.

In yet other features, the method includes generating, in response to the filter usage equaling or exceeding the capacity of the filter, an alert indicating that the filter needs to be replaced.

In further features, generating the alert suggesting replacement of the filter includes generating the alert only once per predetermined period. The predetermined period is greater than or equal to one day.

A computer-readable medium includes processor-executable instructions. The instructions include: determining a capacity of a filter of an HVAC system based at least on dimensions of the filter; determining a threshold based on the capacity of the filter; and monitoring a state of a circulator blower of the HVAC system. Instructions also include calculating a filter usage based on the state of the circulator blower and one of (i) power consumed by the circulator blower and (ii) an operation mode of the HVAC system and generating, in response to the filter usage exceeding the threshold, an alert suggesting replacement of the filter.

A monitoring system for an HVAC system of a building is disclosed. The monitoring system includes at least one processor and a computer readable medium that includes instructions executable by the at least one processor. The instructions include: determining a capacity of a filter of the HVAC system based at least on dimensions of the filter; determining a threshold based on the capacity of the filter; determining a total power value based on power consumed by a circulator blower of the HVAC system since the filter was installed; and calculating a filter usage based on the total power value. The instructions also include generating, in response to the filter usage exceeding the threshold, an alert suggesting replacement of the filter.

In further features, the instructions include receiving data from a power measurement chip of the HVAC system. The data indicates a present power consumed by the circulator blower. The instructions further include increasing the total power value based on the received data.

In other features, the instructions include generating, in response to the filter usage equaling or exceeding the capacity of the filter, an alert indicating that the filter needs to be replaced. In further features, generating the alert suggesting replacement of the filter includes generating the alert only once per predetermined period. The predetermined period is greater than or equal to one day.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 4 is a table of example current values corresponding to operating modes of a particular HVAC system installation.

In the drawings, reference numbers may be reused to identify similar and/or identical elements.

DETAILED DESCRIPTION

According to the present disclosure, a monitoring system can be integrated with a residential or light commercial HVAC (heating, ventilation, or air conditioning) system of a building. The monitoring system can provide information on the status, maintenance, and efficiency of the HVAC system to customers and/or contractors associated with the building. For example, the building may be a single-family residence, and the customer may be the homeowner, a landlord, or a tenant. In other implementations, the building may be a light commercial building, and the customer may be the building owner, a tenant, or a property management company.

As used in this application, the term HVAC encompasses all environmental comfort systems in a building, including heating, cooling, humidifying, dehumidifying, air exchanging, and purifying. Environmental comfort systems include devices such as furnaces, heat pumps, humidifiers, dehumidifiers, ventilators, and air conditioners. In this application, the term HVAC system includes components that perform at least one of heating, ventilation, or air conditioning.

In split HVAC systems with an air handler unit (often, located indoors) and a condensing unit (often, located outdoors), an air handler monitor module and a condensing monitor module, respectively, can be used. The air handler monitor module and the condensing monitor module may be integrated by the manufacturer of the HVAC system, may be added at the time of the installation of the HVAC system, and/or may be retrofitted to an existing HVAC system.

Figure 1:
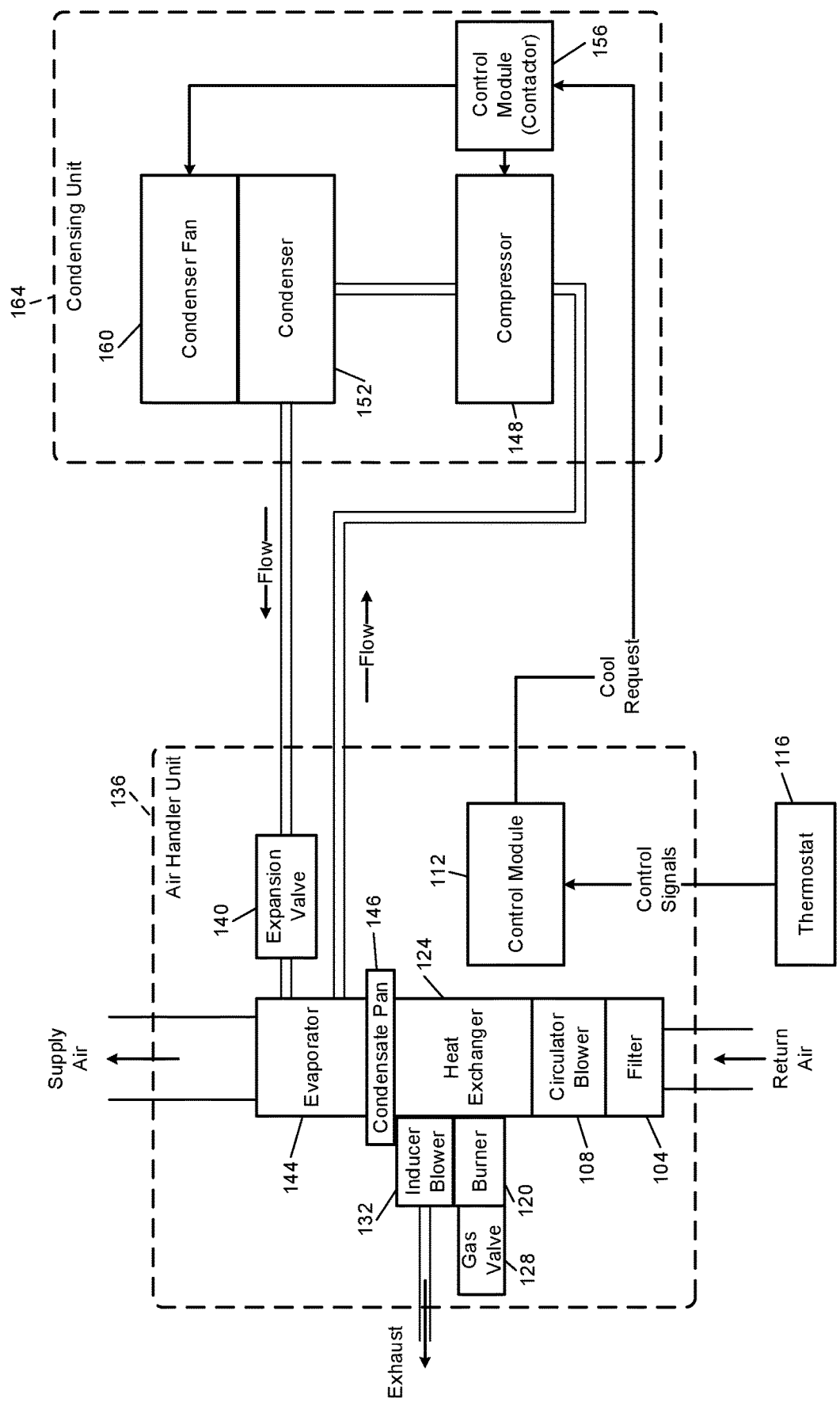
FIG. 1 is a block diagram of an example HVAC system according to the prior art.

In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. In a heat pump system, a reversing valve selectively reverses the flow of refrigerant from what is shown in FIG. 1 depending on whether the system is heating the building or cooling the building. When the flow of refrigerant is reversed, the roles of the evaporator and condenser are reversed—in other words, refrigerant evaporation occurs in what is labeled the condenser while refrigerant condensation occurs in what is labeled the evaporator.

The air handler monitor module and the condensing monitor module (collectively, monitor modules) monitor operating parameters of associated components of the HVAC system. For example, the operating parameters may include power supply current, power supply voltage, current through a motor of the circulator blower, operating and ambient temperatures of inside and outside air, refrigerant temperatures and pressures at various points in the refrigerant loop, fault signals, control signals, and humidity of inside and outside air.

The monitor modules may communicate data between each other. One or both of the monitor modules may upload data to a remote location. The remote location may be accessible via any suitable network, including the Internet.

The remote location includes one or more computers, which will be referred to as servers. The servers execute a monitoring system on behalf of a monitoring company. The monitoring system receives and processes the data from the monitor modules of customers who have such systems installed. The monitoring system can provide performance information, diagnostic alerts, and error messages to a customer and/or third parties, such as designated HVAC contractors.

A server of the monitoring system includes a processor and memory. The memory stores application code that processes data received from the monitor modules and determines existing and/or impending failures, as described in more detail below. The processor executes this application code and stores received data either in the memory or in other forms of storage, including magnetic storage, optical storage, flash memory storage, etc. While the term server is used in this application, the application is not limited to a single server.

A collection of servers may together operate to receive and process data from the monitor modules of multiple buildings. A load balancing algorithm may be used between the servers to distribute processing and storage. The present application is not limited to servers that are owned, maintained, and housed by a monitoring company. Although the present disclosure describes diagnostics and processing and alerting occurring in a remote monitoring system, some or all of these functions may be performed locally using installed equipment and/or customer resources, such as on a customer computer or computers.

Customers and/or HVAC contractors may be notified of current and predicted issues affecting effectiveness or efficiency of the HVAC system, and may receive notifications related to routine maintenance. The methods of notification may take the form of push or pull updates to an application, which may be executed on a smart phone or other mobile device or on a standard computer. Notifications may also be viewed using web applications or on local displays, such as on a thermostat or other displays located throughout the building or on a display (not shown) implemented in one of the monitor modules. Notifications may also include text messages, emails, social networking messages, voicemails, phone calls, etc.

The monitor modules may each sense an aggregate current for the respective unit without measuring individual currents of individual components. The aggregate current data may be processed using frequency domain analysis, statistical analysis, and state machine analysis to determine operation of individual components based on the aggregate current data. This processing may happen partially or entirely in a server environment, remote from the customer's building or residence. Combined with voltage, the aggregate current data at the monitor modules can be used to determine apparent power consumed by the air handler unit and the condensing unit, respectively. The voltage may be measured one time or repeatedly by one or both of the monitor modules. Alternatively, the customer may specify the voltage of the HVAC system—for example, based on a measured value or simply by making a binary choice between 120V and 240V.

The frequency domain analysis may allow individual contributions of HVAC system components to be determined. Some of the advantages of using an aggregate current measurement may include reducing the number of current sensors that would otherwise be necessary to monitor each of the HVAC system components. This reduces bill of materials costs, as well as installation costs and potential installation problems. Further, providing a single time-domain current stream may reduce the amount of bandwidth necessary to upload the current data. Nevertheless, additional current sensors may be used—for example, a circulator blower motor current sensor.

Based on measurements from monitor modules, the monitoring company can determine whether HVAC components are operating at their peak performance and can advise the customer and the contractor when performance is reduced. This performance reduction may be measured for the system as a whole, such as in terms of efficiency, and/or may be monitored for one or more individual components.

For example, filter usage may be determined based on the measured current through the motor of the circulator blower. Alternatively, filter usage may be determined based on the length of use of specific modes of the HVAC system, such as cooling, extra cooling, heating, extra heating, and fan only modes. Since the determined filter usage is based on operational conditions of the HVAC system, the monitoring system may notify a user when the filter needs to be changed rather than requiring the user to rely on less accurate, conventional filter replacement schedules.

In addition, the monitoring system may detect and/or predict failures of one or more components of the system. When a failure is detected, the customer can be notified and potential remediation steps can be taken immediately. For example, components of the HVAC system may be shut down to prevent or minimize damage, such as water damage, to HVAC components. The contractor can also be notified that a service call will be required. Depending on the contractual relationship between the customer and the contractor, the contractor may immediately schedule a service call to the building.

The monitoring system may provide specific information to the contractor, including identifying information of the customer's HVAC system, including make and model numbers, as well as indications of the specific part numbers that appear to be failing. Based on this information, the contractor can allocate the correct repair personnel that have experience with the specific HVAC system and/or component. In addition, the service technician is able to bring replacement parts, avoiding return trips after diagnosis.

Depending on the severity of the failure, the customer and/or contractor may be advised of relevant factors in determining whether to repair the HVAC system or replace some or all of the components of the HVAC system. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of the HVAC system. For example, failure of heat in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment upon installation and/or applying surcharges to repairs and service visits.

For the monitor modules, the monitoring company or contractor may charge the customer the equipment cost, including the installation cost, at the time of installation and/or may recoup these costs as part of the monthly fee. Alternatively, rental fees may be charged for the air handler monitor and condensing monitor modules, and once the monitoring service is stopped, the air handler monitor and condensing monitor modules may be returned.

The monitoring service may allow the customer and/or contractor to remotely monitor and/or control HVAC components, such as setting temperature, enabling or disabling heating and/or cooling, etc. In addition, the customer may be able to track energy usage, cycling times of the HVAC system, and/or historical data. Efficiency and/or operating costs of the customer's HVAC system may be compared against HVAC systems of neighbors, whose buildings will be subject to the same or similar environmental conditions. This allows for more direct comparison of HVAC system and overall building efficiency because environmental variables, such as temperature and wind, are controlled.

The installer can provide information to the remote monitoring system including identification of control lines that were connected to the monitor modules. In addition, information such as the HVAC system type, year installed, manufacturer, model number, BTU rating, filter type, filter size, tonnage, etc.

In addition, because the condensing unit may have been installed separately from the furnace, the installer may also record and provide to the remote monitoring system the manufacturer and model number of the condensing unit, the year installed, the refrigerant type, the tonnage, etc. Upon installation, baseline tests are run. For example, this may include running a heating cycle and a cooling cycle, which the remote monitoring system records and uses to identify initial efficiency metrics. Further, baseline profiles for current, power, and frequency domain current can be established.

The server may store baseline data for the HVAC system of each building. The baselines can be used to detect changes indicating impending or existing failures. For example only, frequency-domain current signatures of failures of various components may be pre-programmed, and may be updated based on observed evidence from contractors. For example, once a malfunction in an HVAC system is recognized, the monitoring system may note the frequency data leading up to the malfunction and correlate that frequency signature with frequency signatures associated with potential causes of the malfunction. For example only, a computer learning system, such as a neural network or a genetic algorithm, may be used to refine frequency signatures. The frequency signatures may be unique to different types of HVAC systems but may share common characteristics. These common characteristics may be adapted based on the specific type of HVAC system being monitored.

The installer may collect a device fee, an installation fee, and/or a subscription fee from the customer. In various implementations, the subscription fee, the installation fee, and the device fee may be rolled into a single system fee, which the customer pays upon installation. The system fee may include the subscription fee for a set number of years, such as 1, 2, 5, or 10, or may be a lifetime subscription, which may last for the life of the home or for the duration of ownership of the building by the customer.

The monitoring system can be used by the contractor during and after installation and during and after repair (i) to verify operation of the air handler monitor and condensing monitor modules and (ii) to verify correct installation of the components of the HVAC system. In addition, the customer may review this data in the monitoring system for assurance that the contractor correctly installed and configured the HVAC system. In addition to being uploaded to the remote monitoring service (also referred to as the cloud), monitored data may be transmitted to a local device in the building. For example, a smartphone, laptop, proprietary portable device, or building management system may receive monitoring information to diagnose problems and receive real-time performance data. Alternatively, data may be uploaded to the cloud and then downloaded onto a local computing device, such as via the Internet from an interactive web site.

The historical data collected by the monitoring system may allow the contractor to properly specify new HVAC components and to better tune configuration, including dampers and setpoints of the HVAC system. The information collected may be helpful in product development and assessing failure modes. The information may be relevant to warranty concerns, such as determining whether a particular problem is covered by a warranty. Further, the information may help to identify conditions, such as unauthorized system modifications, that could potentially void warranty coverage.

Original equipment manufacturers may subsidize partially or fully the cost of the monitoring system and air handler and condensing monitor modules in return for access to this information. Installation and service contractors may also subsidize some or all of these costs in return for access to this information or, as another example, in exchange for being recommended by the monitoring system. Based on historical service data and customer feedback, the monitoring system may provide contractor recommendations to customers.

Figure 2A:
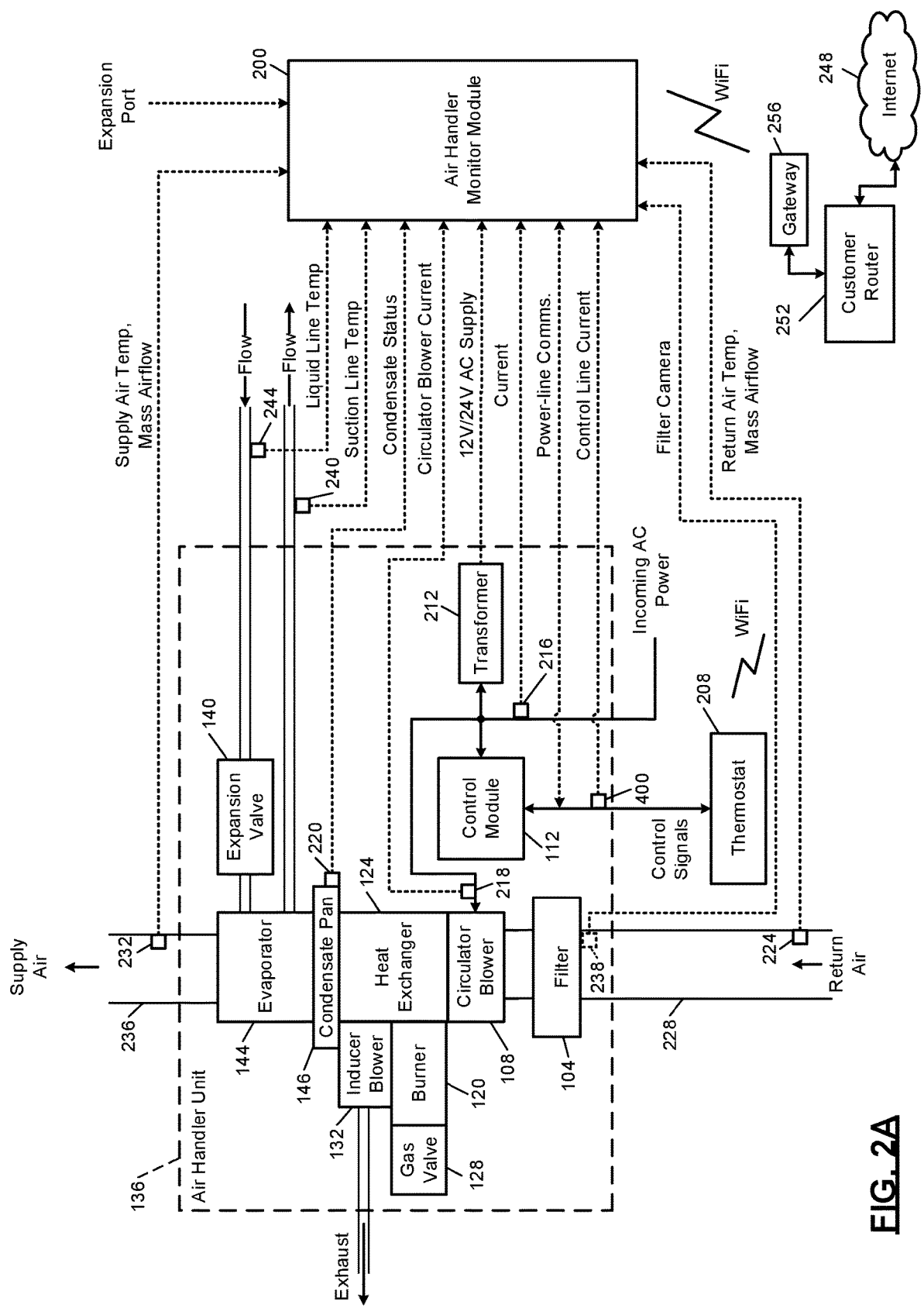
FIG. 2A is a functional block diagram of an example HVAC system including an implementation of an air handler monitor module.
Figure 2B:
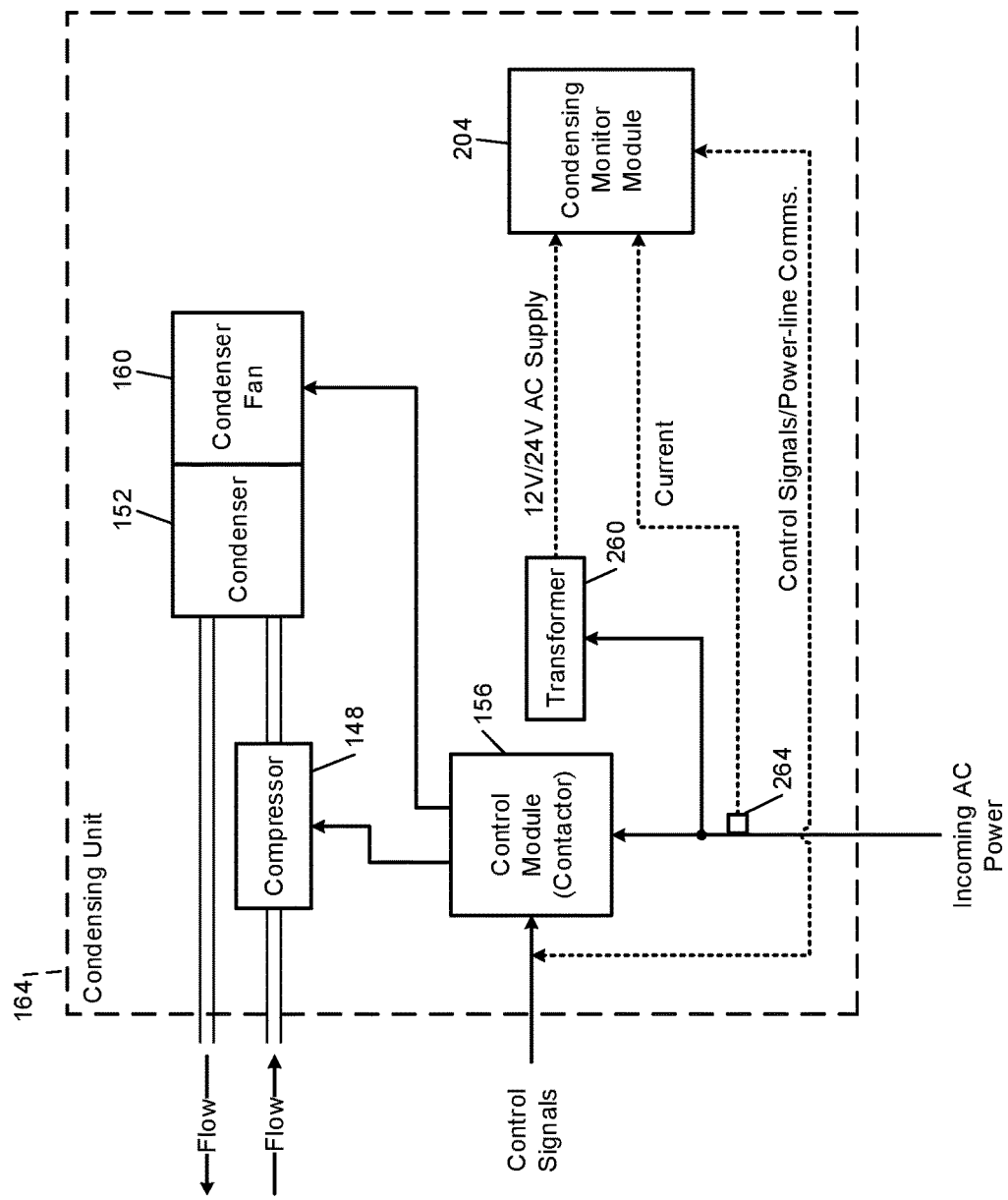
FIG. 2B is a functional block diagram of an example HVAC system including an implementation of a condensing monitor module.

FIGS. 2A-2B are functional block diagrams of an example monitoring system associated with an HVAC system of a building. The air handler unit 136 of FIG. 1 is shown for reference. Because the monitoring systems of the present disclosure can be used in retrofit applications, elements of the air handler unit 136 may remain unmodified. An air handler monitor module 200 and a condensing monitor module 204 can be installed in an existing system without needing to replace the original thermostat 116 shown in FIG. 1. To enable certain additional functionality, however, such as WiFi thermostat control and/or thermostat display of alert messages, the thermostat 116 of FIG. 1 may be replaced with a thermostat 208 having networking capabilities.

In many systems, the air handler unit 136 is located inside the building, while the condensing unit 164 is located outside the building. The present disclosure is not limited, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In FIG. 2A, the air handler monitor module 200 is shown external to the air handler unit 136, although the air handler monitor module 200 may be physically located outside of, in contact with, or even inside of an enclosure, such as a sheet metal casing, of the air handler unit 136.

When installing the air handler monitor module 200 in the air handler unit 136, power is provided to the air handler monitor module 200. For example, a transformer 212 can be connected to an AC line in order to provide AC power to the air handler monitor module 200. The air handler monitor module 200 may measure voltage of the incoming AC line based on this transformed power supply. For example, the transformer 212 may be a 10-to-1 transformer and therefore provide either a 12V or 24V AC supply to the air handler monitor module 200 depending on whether the air handler unit 136 is operating on nominal 120V or nominal 240V power. The air handler monitor module 200 then receives power from the transformer 212 and determines the AC line voltage based on the power received from the transformer 212. In various implementations, the air handler monitor module 200 may scale the received power by a turns ratio of the transformer 212 to account for the voltage being stepped down by the transformer 212. For example, when the turns ratio of the transformer 212 is 10-to-1, the air handler monitor module 200 may multiply the measured voltage by 10 to determine the AC line voltage.

For example, frequency, amplitude, RMS voltage, and DC offset may be calculated based on the measured voltages. Information about when the voltage crosses zero may be used to synchronize various measurements and to determine frequency of the AC power based on counting the number of zero crossings within a predetermined time period. In situations where 3-phase power is used, the order of the phases may be determined.

A current sensor 216 measures incoming current to the air handler unit 136. The current sensor 216 may include a current transformer that snaps around one power lead of the incoming AC power. The current sensor 216 may alternatively include a current shunt or a hall effect device. In various implementations, a power sensor (not shown) may be used in addition to or in place of the current sensor 216. For example, the power sensor may output a real power signal corresponding to the power consumed by the current-consuming components of the air handler unit 136. The real power may be equivalent to an instantaneous dot product of voltage and current, as well as to the product of apparent power (voltage multiplied by current) and power factor of the air handler unit 136.

A circulator blower current sensor 218 measures the current through a motor of the circulator blower 108. The circulator blower current sensor 218 may include a current transformer that snaps around one power lead supplying AC power to the motor of the circulator blower 108. The circulator blower current sensor 218 may alternatively include a current shunt or a hall effect device.

In various other implementations, electrical parameters (such as voltage, current, and power factor) may be measured at a different location, such as at an electrical panel that distributes power from the electrical utility to part or all of the building. For example, the air handler monitor module 200 may receive information from a whole home energy monitor connected to the electrical panel. The whole home energy monitor measures a current consumed by an entire building, such as a house, and may also measure voltage. Based on measured electrical parameters, the whole home energy monitor can determine the total power consumed by all of the electrical appliances in the building, including an HVAC system. The whole home energy monitor may use machine learning to automatically identify and monitor the electrical consumption of individual appliances.

For simplicity of illustration, connections between the control module 112 and various components and sensors of the air handler unit 136 are not shown. In addition, routing of the AC power to various powered components of the air handler unit 136, such as the gas valve 128 and the inducer blower 132, are also not shown for simplicity. The current sensor 216 measures the current entering the air handler unit 136 and therefore represents an aggregate current of the current-consuming components of the air handler unit 136.

The control module 112 controls operation in response to signals from the thermostat 208 received over control lines. The air handler monitor module 200 monitors the control lines. The control lines may include a call for cool, a call for heat, and a call for fan. The control lines may include a line corresponding to a state of a reversing valve in heat pump systems.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

The control lines may be monitored by attaching leads to terminal blocks at the control module 112 at which the fan and heat signals are received. These terminal blocks may include additional connections where leads can be attached between these additional connections and the air handler monitor module 200. Alternatively, leads from the air handler monitor module 200 may be attached to the same location as the fan and heat signals, such as by putting multiple spade lugs underneath a single screw head.

In various implementations, the cool signal from the thermostat 208 may be disconnected from the control module 112 and attached to the air handler monitor module 200. The air handler monitor module 200 can then provide a switched cool signal to the control module 112. This allows the air handler monitor module 200 to interrupt operation of the air conditioning system, such as upon detection of water by one of the water sensors. The air handler monitor module 200 may also interrupt operation of the air conditioning system based on information from the condensing monitor module 204, such as detection of a locked rotor condition in the compressor.

A condensate sensor 220 measures condensate levels in the condensate pan 146. If a level of condensate gets too high, this may indicate a plug or clog in the condensate pan 146 or a problem with hoses or pumps used for drainage from the condensate pan 146. The condensate sensor 220 may be installed along with the air handler monitor module 200 or may already be present. When the condensate sensor 220 is already present, an electrical interface adapter may be used to allow the air handler monitor module 200 to receive the readings from the condensate sensor 220. Although shown in FIG. 2A as being internal to the air handler unit 136, access to the condensate pan 146, and therefore the location of the condensate sensor 220, may be external to the air handler unit 136.

Additional water sensors, such as a conduction (wet floor) sensor may also be installed. The air handler unit 136 may be located on a catch pan, especially in situations where the air handler unit 136 is located above living space of the building. The catch pan may include a float switch. When enough liquid accumulates in the catch pan, the float switch provides an over-level signal, which may be sensed by the air handler monitor module 200.

A return air sensor 224 is located in a return air plenum 228. The return air sensor 224 may measure temperature and may also measure mass airflow. In various implementations, a thermistor may be multiplexed as both a temperature sensor and a hot wire mass airflow sensor. In various implementations, the return air sensor 224 is upstream of the filter 104 but downstream of any bends in the return air plenum 228.

A supply air sensor 232 is located in a supply air plenum 236. The supply air sensor 232 may measure air temperature and may also measure mass airflow. The supply air sensor 232 may include a thermistor that is multiplexed to measure both temperature and, as a hot wire sensor, mass airflow. In various implementations, such as is shown in FIG. 2A, the supply air sensor 232 may be located downstream of the evaporator 144 but upstream of any bends in the supply air plenum 236.

A differential pressure reading may be obtained by placing opposite sensing inputs of a differential pressure sensor (not shown) in the return air plenum 228 and the supply air plenum 236, respectively. For example only, these sensing inputs may be collocated or integrated with the return air sensor 224 and the supply air sensor 232, respectively. In various implementations, discrete pressure sensors may be placed in the return air plenum 228 and the supply air plenum 236. A differential pressure value can then be calculated by subtracting the individual pressure values.

A filter camera 238 may be located in the return plenum 228 near the filter 104. The filter camera 238 captures images of the filter 104. A light source (not shown) may illuminate the filter 104. The air handler monitor module 200 receives the images from the filter camera 238 and may determine a condition of the filter 104—for example, a usage level of the filter—based on the received images. In various implementations, a reflectance or transmittance photosensor (and light source) may be used in place of the filter camera 238.

The air handler monitor module 200 also receives a suction line temperature from a suction line temperature sensor 240. The suction line temperature sensor 240 measures refrigerant temperature in the refrigerant line between the evaporator 144 of FIG. 2A and the compressor 148 of FIG. 2B. A liquid line temperature sensor 244 measures the temperature of refrigerant in a liquid line traveling from the condenser 152 of FIG. 2B to the expansion valve 140 of FIG. 2A.

The air handler monitor module 200 may include one or more expansion ports to allow for connection of additional sensors and/or to allow connection to other devices, such as a home security system, a proprietary handheld device for use by contractors, or a portable computer.

The air handler monitor module 200 also monitors control signals from the thermostat 208. Because one or more of these control signals is also transmitted to the condensing unit 164 of FIG. 2B, these control signals can be used for communication between the air handler monitor module 200 and the condensing monitor module 204 of FIG. 2B.

The air handler monitor module 200 may transmit frames of data corresponding to periods of time. For example only, 7.5 frames may span one second (in other words, 0.1333 seconds per frame). Each frame of data may include voltage, current, temperatures, control line status, and water sensor status. Calculations may be performed for each frame of data, including averages, powers, RMS, and FFT. Then the frame is transmitted to the monitoring system.

The voltage and current signals may be sampled by an analog-to-digital converter at a certain rate, such as 1920 samples per second. The frame length may be measured in terms of samples. When a frame is 256 samples long, at a sample rate of 1920 samples per second, there will be 7.5 frames per second.

The sampling rate of 1920 Hz has a Nyquist frequency of 960 Hz and therefore allows an FFT bandwidth of up to approximately 960 Hz. An FFT limited to the time span of a single frame may be calculated for each frame. Then, for that frame, instead of transmitting all of the raw current data, only statistical data (such as average current) and frequency-domain data are transmitted. This conserves substantial bandwidth compared to transmitting all of the raw data.

This gives the monitoring system current data having a 7.5 Hz resolution, and gives frequency-domain data with approximately the 960 Hz bandwidth. The time-domain current and/or the derivative of the time-domain current may be analyzed to detect impending or existing failures. In addition, the current and/or the derivative may be used to determine which set of frequency-domain data to analyze. For example, certain time-domain data may indicate the approximate window of activation of a hot surface igniter, while frequency-domain data is used to assess the state of repair of the hot surface igniter.

In various implementations, the air handler monitor module 200 may only transmit frames during certain periods of time. These periods may be critical to operation of the HVAC system. For example, when thermostat control lines change, the air handler monitor module 200 may record data and transmit frames for a predetermined period of time after that transition. Then, if the HVAC system is operating, the air handler monitor module 200 may intermittently record data and transmit frames until operation of the HVAC system has completed.

The air handler monitor module 200 transmits data measured by both the air handler monitor module 200 itself and the condensing monitor module 204 over a wide area network 248, such as the Internet (referred to as the Internet 248). The air handler monitor module 200 may access the Internet 248 using a router 252 of the customer. The customer router 252 may already be present to provide Internet access to other devices (not shown) within the building, such as a customer computer and/or various other devices having Internet connectivity, such as a DVR (digital video recorder) or a video gaming system.

The air handler monitor module 200 communicates with the customer router 252 using a proprietary or standardized, wired or wireless protocol, such as Bluetooth, ZigBee (IEEE 802.15.4), 900 Megahertz, 2.4 Gigahertz, or WiFi (IEEE 802.11). In various implementations, a gateway 256 is implemented, which creates a wired (such as powerline) or wireless connection to the air handler monitor module 200. The gateway 256 may interface with the customer router 252 using a wired or wireless protocol, such as Ethernet (IEEE 802.3).

The thermostat 208 may also communicate with the customer router 252 using WiFi.

Alternatively, the thermostat 208 may communicate with the customer router 252 via the gateway 256. In various implementations, the air handler monitor module 200 and the thermostat 208 do not communicate directly. However, because they are both connected through the customer router 252 to a remote monitoring system, the remote monitoring system may allow for control of one based on signals from the other. For example, various faults identified based on information from the air handler monitor module 200 may cause the remote monitoring system to adjust temperature setpoints of the thermostat 208 and/or display warning or alert messages on the thermostat 208.

In various implementations, the transformer 212 may be omitted, and the air handler monitor module 200 may include a power supply that is directly powered by the incoming AC power. Further, power-line communications may be conducted over the AC power line instead of over lower-voltage HVAC control lines.

In various implementations, the current sensor 400 may be omitted, and instead a voltage sensor (not shown) may be used. The control module 112 includes an internal transformer that provides the power (e.g., 24 Volts) for the thermostat control signals as well as for other components of the air handler unit 136, such as relays and valves.

The voltage sensor measures the voltage of an output of a transformer internal to the control module 112. The air handler monitor module 200 may measure the voltage of the incoming AC power and calculate a ratio of the voltage input to the internal transformer to the voltage output from the internal transformer. As the current load on the internal transformer increases, the impedance of the internal transformer causes the voltage of the output power to decrease. Therefore, the current draw from the internal transformer can be inferred from the measured ratio (also called an apparent transformer ratio). The inferred current draw may be used in place of the directly measured aggregate current draw described in the present disclosure.

In FIG. 2B, the condensing monitor module 204 is installed in the condensing unit 164. A transformer 260 converts incoming AC voltage into a stepped-down voltage for powering the condensing monitor module 204. In various implementations, the transformer 260 may be a 10-to-1 transformer. In some implementations, the transformer 260 may be omitted and the condensing monitor module 204 may include a power supply operating from the full line voltage of the incoming AC power.

A current sensor 264 measures current entering the condensing unit 164. The condensing monitor module 204 may also measure voltage from the supply provided by the transformer 260. Based on measurements of the voltage and current, the condensing monitor module 204 may calculate power and/or may determine power factor. In various implementations, a power sensor (not shown) may be used in addition to or in place of the current sensor 264. The power sensor may provide readings of real power consumed by the current-consuming components of the condensing unit 164.

A liquid line temperature sensor 266 measures the temperature of refrigerant traveling from the condenser 152 to the air handler unit 136. In various implementations, the liquid line temperature sensor 266 is located prior to any filter-drier, such as the filter-drier 154 of FIG. 2A. In normal operation, the liquid line temperature sensor 266 and the liquid line temperature sensor 246 of FIG. 2A may provide similar data, and therefore one of the liquid line temperature sensors 246 or 266 may be omitted. However, having both of the liquid line temperature sensors 246 and 266 may allow for certain problems to be diagnosed, such as a kink or other restriction in the refrigerant line between the air handler unit 136 and the condensing unit 164.

In various implementations, the condensing monitor module 204 may receive ambient temperature data from a temperature sensor (not shown). When the condensing monitor module 204 is located outdoors, the ambient temperature represents an outside ambient temperature. The temperature sensor supplying the ambient temperature may be located outside of an enclosure of the condensing unit 164. Alternatively, the temperature sensor may be located within the enclosure, but exposed to circulating air. In various implementations the temperature sensor may be shielded from direct sunlight and may be exposed to an air cavity that is not directly heated by sunlight. Alternatively or additionally, online (including Internet-based) weather data based on a geographical location of the building may be used to determine sun load, outside ambient air temperature, precipitation, and humidity.

In various implementations, the condensing monitor module 204 may receive refrigerant temperature data from refrigerant temperature sensors (not shown) located at various points, such as before the compressor 148 (referred to as a suction line temperature), after the compressor 148 (referred to as a compressor discharge temperature), after the condenser 152 (referred to as a liquid line out temperature), and/or at one or more points along a coil of the condenser 152. The location of temperature sensors may be dictated by a physical arrangement of the condenser coils. Additionally or alternatively to the liquid line out temperature sensor, a liquid line in temperature sensor may be used. An approach temperature may be calculated, which is a measure of how close the condenser 152 has been able to bring the liquid line out temperature to the ambient air temperature.

During installation, the location of the temperature sensors may be recorded. Additionally or alternatively, a database may be maintained that specifies where temperature sensors are placed. This database may be referenced by installers and may allow for accurate remote processing of the temperature data. The database may be used for both air handler sensors and compressor/condenser sensors. The database may be prepopulated by the monitoring company or may be developed by trusted installers, and then shared with other installation contractors.

As described above, the condensing monitor module 204 may communicate with the air handler monitor module 200 over one or more control lines from the thermostat 208. In these implementations, data from the condensing monitor module 204 is transmitted to the air handler monitor module 200, which in turn uploads the data over the Internet 248.

In various implementations, the transformer 260 may be omitted, and the condensing monitor module 204 may include a power supply that is directly powered by the incoming AC power. Further, power-line communications may be conducted over the AC power line instead of over lower-voltage HVAC control lines.

Figure 2C:
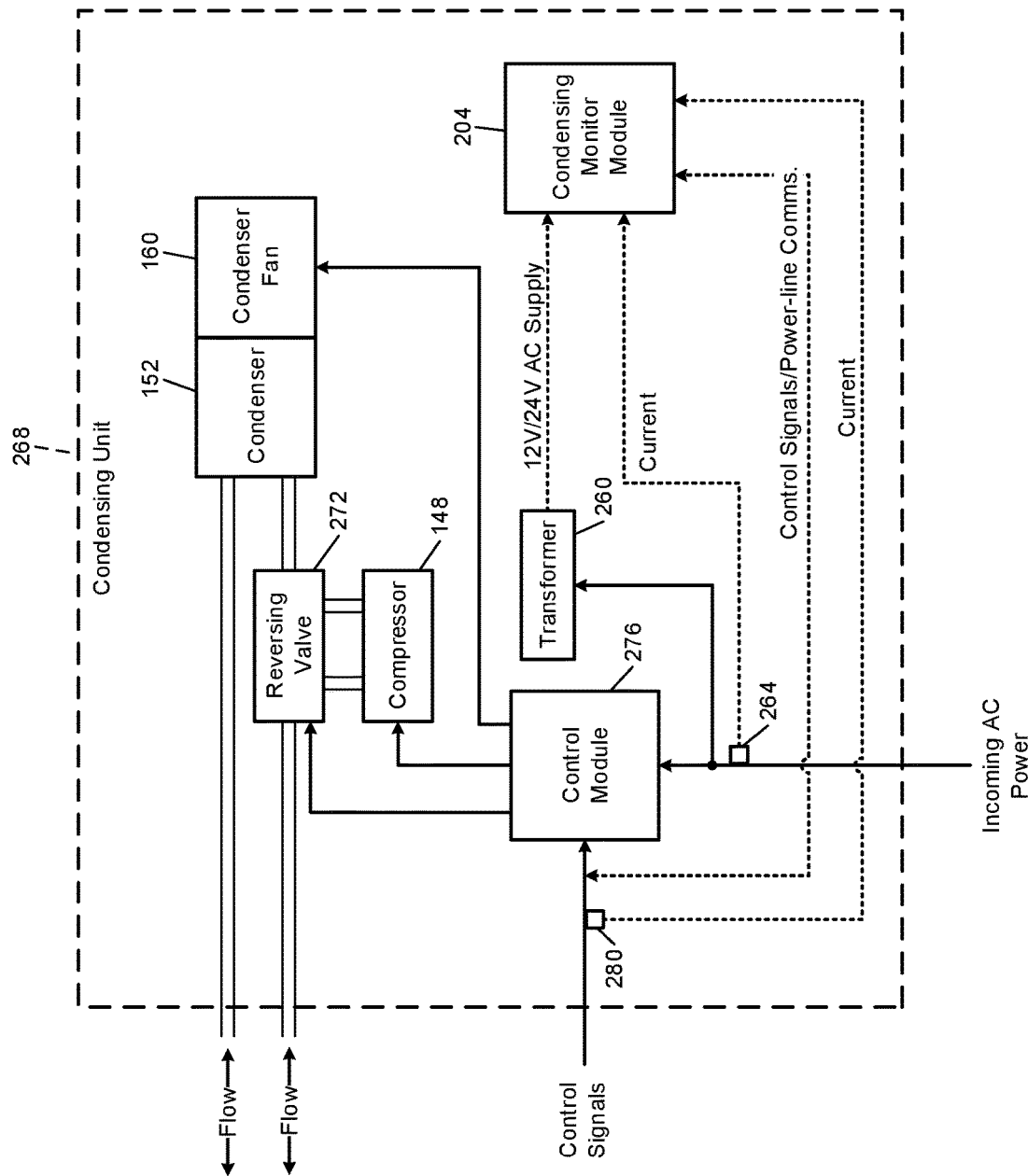
FIG. 2C is a functional block diagram of an example HVAC system based around a heat pump.

In FIG. 2C, an example condensing unit 268 is shown for a heat pump implementation. The condensing unit 268 may be configured similarly to the condensing unit 164 of FIG. 2B. Similarly to FIG. 2B, the transformer 260 may be omitted in various implementations. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode).

In various implementations, a current sensor 280 is implemented to measure one or more currents of the control signals. The current sensor 280 may measure an aggregate current of all the control lines arriving at the condensing unit 268. The aggregate current may be obtained by measuring the current of a common control return conductor. The aggregate current measured by the current sensor 280 may be used to determine the state of multiple heat pump control signals, such as signals that control operation of defrosting functions and the reversing valve. The aggregate current measured by the current sensor 280 may also be used to determine the state of calls for varying levels of compressor capacity. While not shown in FIG. 2B, the current sensor 280 may similarly be installed in the condensing unit 164.

Figure 3:
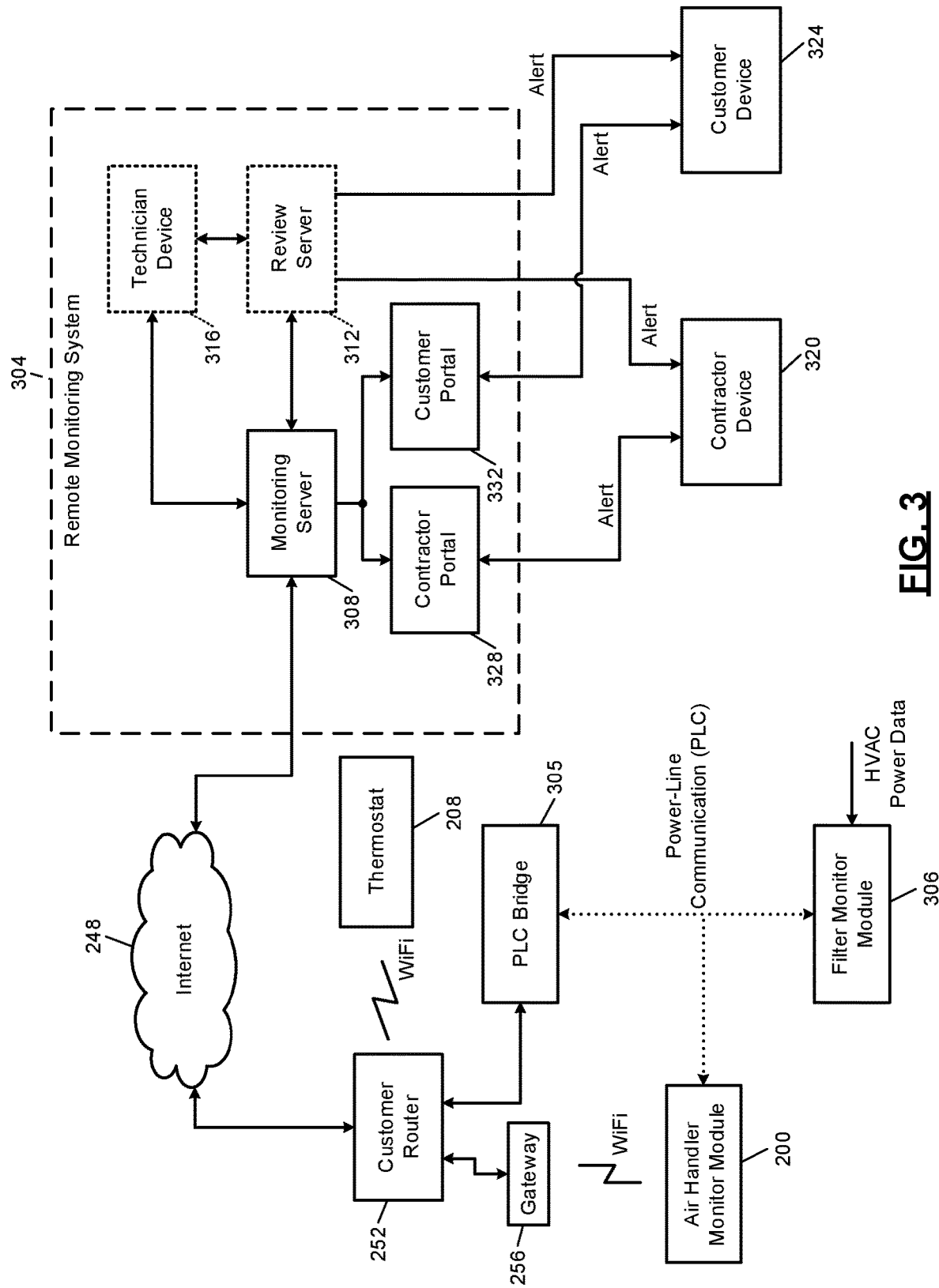
FIG. 3 is a high-level functional block diagram of an example system including an implementation of a remote monitoring system.

In FIG. 3, the air handler monitor module 200 and the thermostat 208 are shown communicating, using the customer router 252, with a remote monitoring system 304 via the Internet 248. In other implementations, the condensing monitor module 204 may transmit data from the air handler monitor module 200 and the condensing monitor module 204 to an external wireless receiver. The external wireless receiver may be a proprietary receiver for a neighborhood in which the building is located, or may be an infrastructure receiver, such as a metropolitan area network (such as WiMAX), a WiFi access point, or a mobile phone base station. In various implementations, the air handler monitor module 200 may communicate with the customer router 252 over power-line communications (PLC) via a PLC bridge 305. In some implementations, a filter monitor module 306 may communicate with the air handler monitor module 200 over PLC. The filter monitor module 306 may also communicate with the remote monitoring system 304 through the PLC bridge 305 and the customer router 252. Although in FIG. 3 the PLC bridge 305 is shown separate from the thermostat 208, in various implementations, the PLC bridge 305 may be integrated into the thermostat 208.

The filter monitor module 306 receives HVAC data, such as power data from an energy monitor, that indicates whether the circulator blower of the HVAC system is running and indicates a speed of the circulator blower. For example, the mode in which the HVAC system is operating (heating, cooling, fan-only) may indicate the speed of the circulator blower. The speed of the circulator blower may also be inferred from the power draw of the circulator blower or even from the power draw of the air handler unit because the power draw of the circulator blower is such a large contributor to overall power draw.

The energy monitor may be a whole-building energy monitor installed at an electrical distribution panel, also referred to as a current or power de-aggregator device. In various implementations, the filter monitor module 306 may be based on a simplified implementation of the air handler monitor module and in fact may be a depopulated (certain components not placed on a printed circuit board) version of the air handler monitor module 200.

The remote monitoring system 304 includes a monitoring server 308 that receives data from the air handler monitor module 200 and the thermostat 208 and maintains and verifies network continuity with the air handler monitor module 200. The remote monitoring system may also receive data from the filter monitor module 306. The monitoring server 308 executes various algorithms to identify problems, such as failures or decreased efficiency, and to predict impending faults.

The monitoring server 308 may notify a review server 312 when a problem is identified or a fault is predicted. This programmatic assessment may be referred to as an advisory. Some or all advisories may be triaged by a technician to reduce false positives and potentially supplement or modify data corresponding to the advisory. For example, a technician device 316 operated by a technician is used to review the advisory and to monitor data (in various implementations, in real-time) from the air handler monitor module 200 via the monitoring server 308.

The technician using the technician device 316 reviews the advisory. If the technician determines that the problem or fault is either already present or impending, the technician instructs the review server 312 to send an alert to either or both of a contractor device 320 or a customer device 324. The technician may determine that, although a problem or fault is present, the cause is more likely to be something different than specified by the automated advisory. The technician can therefore issue a different alert or modify the advisory before issuing an alert based on the advisory. The technician may also annotate the alert sent to the contractor device 320 and/or the customer device 324 with additional information that may be helpful in identifying the urgency of addressing the alert and presenting data that may be useful for diagnosis or troubleshooting.

In various implementations, minor problems may be reported to the contractor device 320 only so as not to alarm the customer or inundate the customer with alerts. Whether the problem is considered to be minor may be based on a threshold. For example, an efficiency decrease greater than a predetermined threshold may be reported to both the contractor and the customer, while an efficiency decrease less than the predetermined threshold is reported to only the contractor.

In some circumstances, the technician may determine that an alert is not warranted based on the advisory. The advisory may be stored for future use, for reporting purposes, and/or for adaptive learning of advisory algorithms and thresholds. In various implementations, a majority of generated advisories may be closed by the technician without sending an alert.

Based on data collected from advisories and alerts, certain alerts may be automated. For example, analyzing data over time may indicate that whether a certain alert is sent by a technician in response to a certain advisory depends on whether a data value is on one side of a threshold or another. A heuristic can then be developed that allows those advisories to be handled automatically without technician review. Based on other data, it may be determined that certain automatic alerts had a false positive rate over a threshold. These alerts may be put back under the control of a technician.

In various implementations, the technician device 316 may be remote from the remote monitoring system 304 but connected via a wide area network, such as the Internet 248. For example only, the technician device 316 may include a computing device such as a laptop, desktop, or tablet.

With the contractor device 320, the contractor can access a contractor portal 328, which provides historical and real-time data from the air handler monitor module 200. The contractor using the contractor device 320 may also contact the technician using the technician device 316. The customer using the customer device 324 may access a customer portal 332 in which a graphical view of the system status as well as alert information is shown. The contractor portal 328 and the customer portal 332 may be implemented in a variety of ways according to the present disclosure, including as an interactive web page, a computer application, and/or an app for a smartphone or tablet.

In various implementations, data shown by the customer portal may be more limited and/or more delayed when compared to data visible in the contractor portal 328. In various implementations, the contractor device 320 can be used to request data from the air handler monitor module 200, such as when commissioning a new installation.

In various implementations, some or all of the functionality of the remote monitoring system 304 may be local instead of remote from the building. For example only, some or all of the functionality may be integrated with the air handler monitor module 200 or the condensing monitor module 204. Alternatively, a local controller, such as a building management system, may implement some of all of the functionality of the remote monitoring system 304.

Detection of various faults and calculation of filter usage may require knowledge of which mode the HVAC system is operating in, and more specifically, which mode has been commanded by the thermostat. For example, when a call for heat is made, the furnace will progress through a sequence of states. For example only, the sequence may begin with activating the inducer blower, opening the gas valve, igniting the gas, and turning on the circulator blower. Each of these states may be detectable in current data, although frequency-domain as well as time-domain data may be necessary to reliably determine certain states. When this sequence of states appears to indicate that the furnace is restarting, a fault may be declared. A furnace restart may be detected when the measured current matches a baseline current profile for a certain number of states and then diverges from the baseline current profile for the next state or states.

Filter usage may be estimated based on power consumed by the motor of the circulator blower 108. The power consumption is determined based on measured parameters such as voltage supplied to the motor, current through the motor, and elapsed time. Additionally or alternatively, a dirty filter may be detected based on changes in power, current, and power factor coupled with a decrease in temperature split and reduced pressure. The power, current, and power factor may be dependent on motor type. When a mass airflow sensor is available, the mass airflow sensor may be able to directly indicate a flow restriction in systems using a permanent-split capacitor motor.

Returning back to FIG. 2A, in order for the monitoring system to determine which mode the HVAC system is operating in, each control signal between the thermostat 208 and the control module 112 may be monitored. Because the monitoring system of the present disclosure can be used in a retrofit environment, this may require connecting leads to each of the control lines. Making individual connections requires additional installation time and therefore expense. As the number of connections increases, the opportunities for a loose connection, and therefore erroneous readings, increase.

Further, because connecting leads may require removing and reattaching control lines from the control module, the loose connection may even affect normal operation of the HVAC system, such as the ability of the thermostat 208 to control certain aspects of the control module 112. Further, a location at which the control lines are accessible may be difficult for an installer to reach without removing other components of the HVAC system, which increases installation time and also increases the risk of introducing problems.

With multiple connections, even when the control lines are successfully connected, there is a risk that the connections will be misidentified—for example, leading the monitoring system to believe that a call for cool has been made by the thermostat 208 when, in fact, a call for heat was instead made. Some HVAC systems may use those control lines in a non-standard way. Again, this may lead to misinterpretation of the control signals by the monitoring system. A further complication is introduced by "communicating systems," which do not rely on standard HVAC control lines and instead multiplex multiple signals onto one or more control lines. For example only, in a communicating system, the thermostat 208 and the control module 112 may perform bidirectional digital communication using two or more lines. As a result, individual control lines corresponding to each mode of operation of the HVAC system may not be present.

The present disclosure presents an alternative to individually sensing the control lines and this alternative may eliminate or mitigate some or all of the issues identified above. When the thermostat 208 makes a call for heat, one or more components of the HVAC system will draw a current to service the call for heat. For example, a relay (not shown) may be energized to open the gas valve 128. Meanwhile, when a call for cool is made by the thermostat 208, other components may draw a current—for example, a relay may control the control module 156.

The current consumed by these various devices may be different. For example, the current required to close a switch of the control module 156 may be greater than the current required to open the gas valve 128. An aggregate control line current may therefore uniquely indicate various modes of operation. In FIG. 2A, a current sensor 400 is shown associated with the control signals exchanged between the thermostat 208 and the control module 112. The current is received by the air handler monitor module 200.

In some HVAC systems, the difference in current between two different modes may not be distinguishable with sufficient accuracy. For these situations, additional sensing may be required. For example, a sensor may be connected to a specific control line to provide additional information so that the mode of operation can be disambiguated.

In FIG. 4, example aggregate control line currents are shown for five different operational modes of a particular HVAC system. In an idle mode, none of the control lines are activated and an aggregate current is 40 mA. In heating mode, a "W" control line, which indicates a call for heat, results in an aggregate current level of 60 mA. In a fan-only mode (for many thermostats, this is when the fan setting is changed from auto to on), a "G" control line is activated, resulting in an aggregate control line current of 110 mA.

When a call for heating is combined with a call for fan, both control lines, "W" and "G" are activated, resulting in an aggregate line current of 150 mA. When a call for cool is made, control lines "Y" and "G" are activated with a resulting control line current of 600 mA.

Note that for the heating mode, the "W" control line can be activated by itself (without requiring activation of the "G" line). This is because in some HVAC systems, such as used for FIG. 4, a call for heat using the "W" control line automatically results in the fan being activated. Meanwhile, in some HVAC systems, including the example used for FIG. 4, the thermostat explicitly enables the fan (using the "G" line) when making a call for cool.

Note that the control line currents for activation of the "W" and "G" control lines independently do not add up to equal the control line current when the "W" and "G" lines are activated together. The inability to calculate the aggregate control line current by linear superposition may be a common feature in HVAC systems. For example, various components activated by the "W" control line and the "G" control line may be common so that when both the "W" and "G" control lines are activated, those common components only contribute once to the aggregate control line current.

Figure 5A:
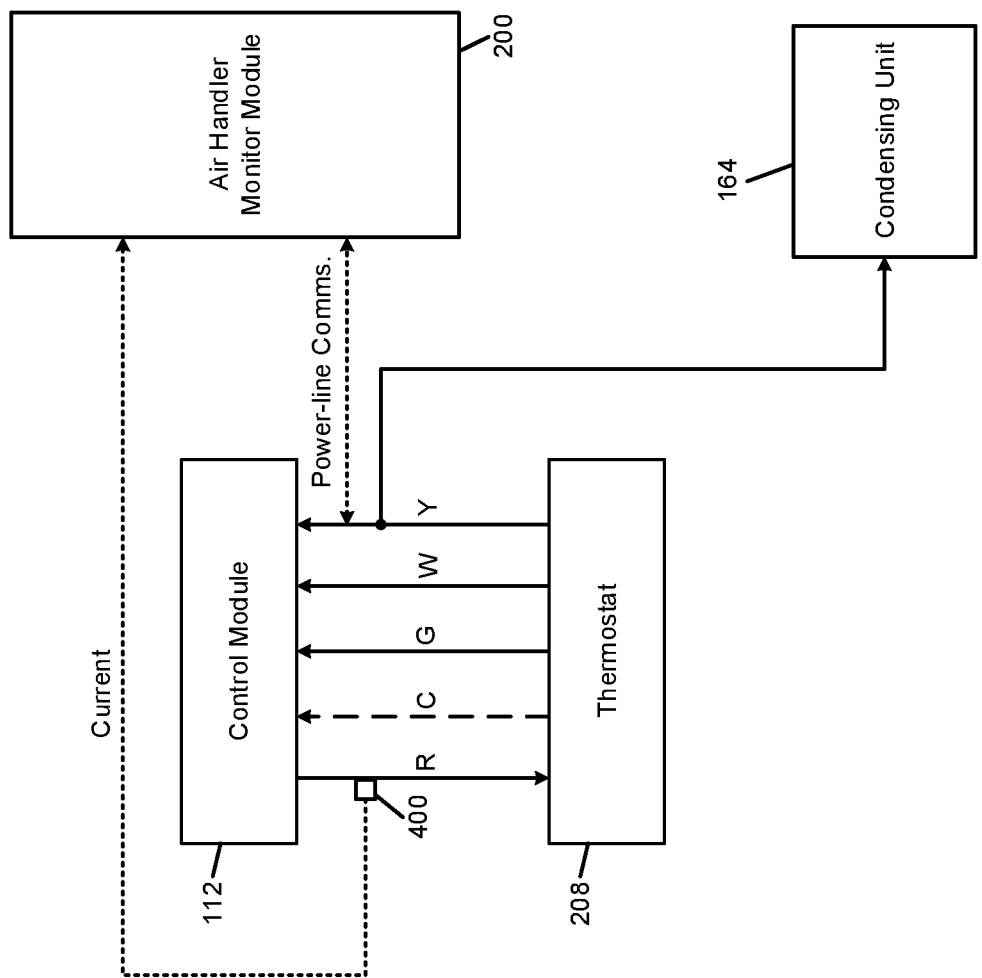
FIGS. 5A-5B are functional block diagrams showing additional detail of example control lines between a thermostat and a control module.

In FIG. 5A, a more detailed view of the control signals for an example HVAC system is shown. The thermostat 208 received power over an "R" control line. In some implementations, a "C" control line provides a current return path. The "C" control line is omitted in various HVAC systems. A "G" line indicates a call for the circulator blower, or fan. A "W" line indicates a call for heating. A "Y" line indicates a call for cooling. The air handler monitor module 200 monitors a current sensed by the current sensor 400. The current sensor 400 may measure the "R" line (as show in FIG. 5A) or, in systems with a "C" line, may measure the "C" line (not shown). The air handler monitor module 200 performs power-line communications with the condensing unit 164 over a shared line, such as over the "Y" line.

In systems without cooling, the "Y" line may be omitted and, in systems without heating, the "W" line may be omitted. Further, the "G" line may be omitted in systems where the fan is only actuated automatically. Additional control lines that may be present include a "Y2" line that indicates a second stage call for cool. For example, the "Y2" line may indicate that the cooling should be greater or lesser than for the "Y" line. An adjustment in the amount of cooling may be accomplished by adjusting how many compressors are used to provide cooling and/or by adjusting a capacity of a compressor, such as with an unloader valve, a variable speed drive, etc.

A "W2" line may provide for second stage heating, which in a heat pump may include an electric secondary heating element. An "O/B" line may be used to control a mode of the heat pump. The heat pump systems may include additional control lines such as an EMR (Energy Management Recovery) line or an auxiliary heat line. Additional and alternative control lines may be present in various other HVAC systems for which the monitoring system is used.

While the letter of each control line may indicate a commonly-used color for the shielding of the wire, the actual colors and labels of the control lines may differ in real world systems. For this reason, the aggregate current may be a more reliable indicator of mode than the state of individual, unspecified control lines.

Figure 5B:
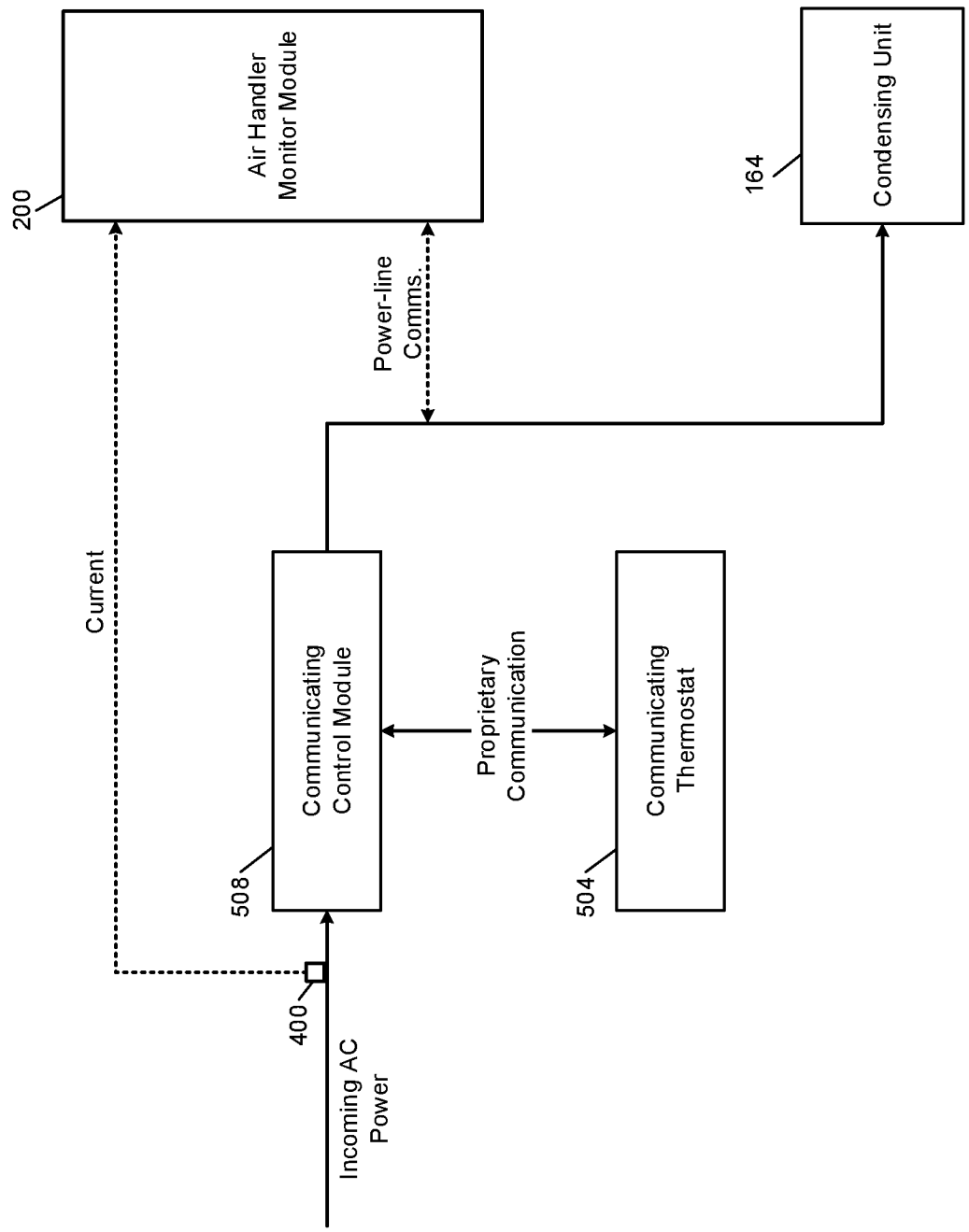

In FIG. 5B, a communicating thermostat 504 communicates with a communicating control module 508 using some form of proprietary communication such as a bidirectional digital interface. The current sensor 400 may therefore measure input power to the communicating control module 508. The measured electrical values are received by the air handler monitor module 200 and may be used to infer operating mode. The condensing unit 164 may receive a single control signal from the communicating control module 508. The air handler monitor module 200 may therefore use that control line for power-line communications with the condensing monitor module 204.

Figure 6:
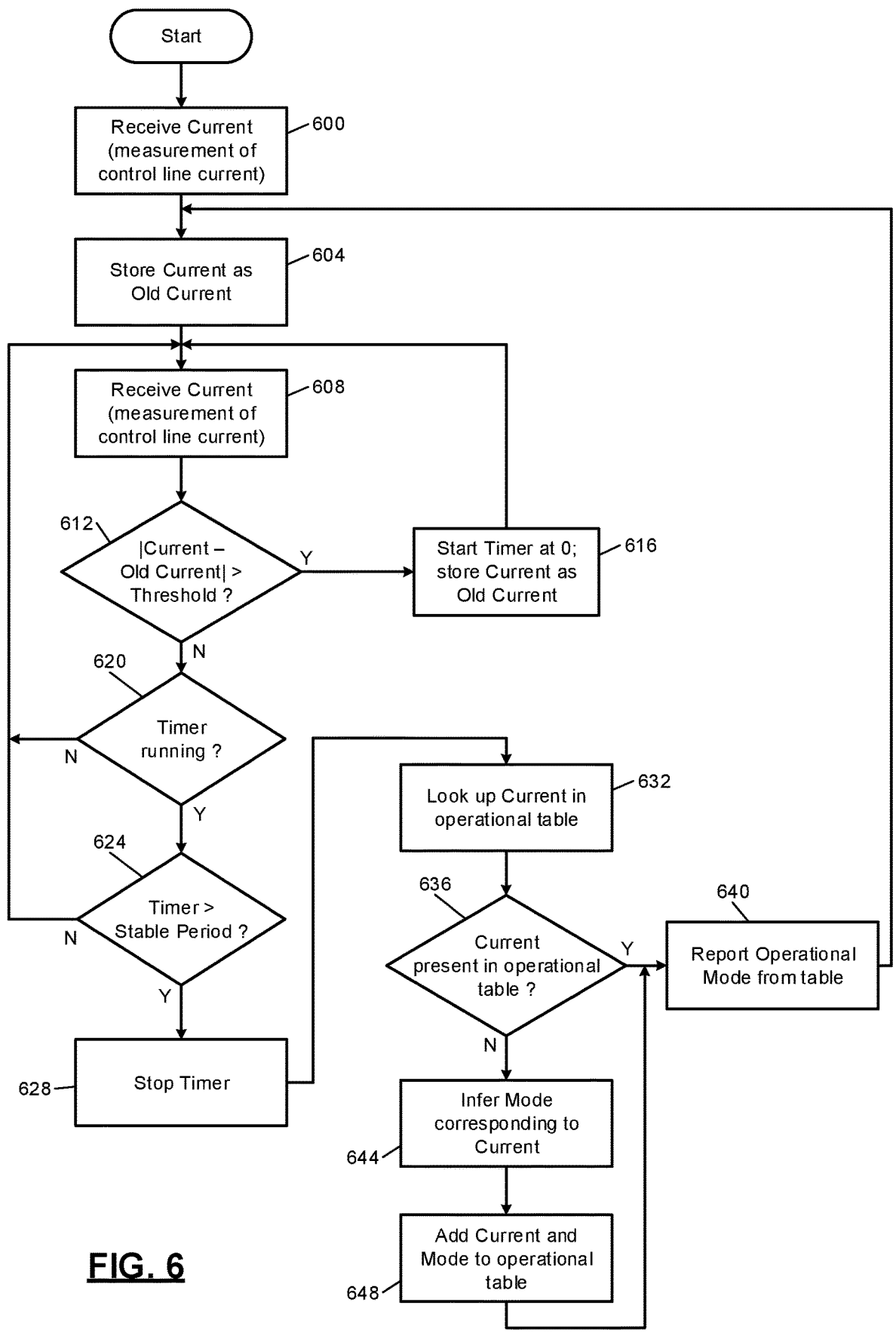
FIG. 6 is a flowchart of example operation of a monitoring system that determines operating modes of an HVAC system based on control line current.

In FIG. 6, a flowchart shows example operation of a monitoring system that determines HVAC operation mode based on aggregate control line current. Control begins at 600, where a current measurement is received corresponding to an aggregate measure of control line currents. Control continues at 604 where the received current is stored as an old current to which future currents will be compared.

Control continues at 608 where a new current measurement is received. Control continues at 612 where, if an absolute value of the difference between the present current and the stored old current is greater than a threshold, control transfers to 616; otherwise, control transfers to 620. At 616, a timer is started at a value of zero and the present current is stored as the old current. Control then returns to 608.

The timer may be implemented to force a wait interval for the aggregate current value to stabilize at a steady state value. When the mode of the HVAC system changes, the value of the current may initially take a period of time to stabilize. At 620, if the timer is running, indicating that a large change in current had occurred, implying a potential change in mode, control transfers to 624; otherwise, control returns to 608.

At 624, the timer was started and, therefore, the present value of the timer is compared to a predetermined stable period of time. If the timer exceeds that predetermined stable period, control transfers to 628; otherwise, control returns to 608. At 628, the timer is stopped and at 632 the current, which is the most recent value of the current and represents a steady state current, is looked up in an operational table.

For example only, the operational table may be similar in concept to that shown in FIG. 4. While FIG. 4 shows an individual current value for each mode of operation, a range may be defined around each current value in the table. This may take the form of a percentage of the current value, or upper and lower limits may be explicitly defined. For example only, each current level in the table may be associated with an uncertainty of plus or minus ten percent. Therefore, if the present value of the current is within plus or minus ten percent of the value in the table, that table entry may be assumed to be the correct table entry. Control continues at 636, where if the value of the current corresponds to a row in the operational table, control transfers to 640; otherwise, control transfers to 644.

In various implementations, the operational table may be predefined based on the identity of the HVAC system. The current levels may be empirically determined and/or specified by the manufacturer for a specific model and configuration of HVAC system. This table may be stored in the monitoring system and accessed based on an identifier associated with the installed HVAC system. In other implementations, the operational table may be generated as part of a calibration routine, which may be performed by an installer of the monitoring system and/or a customer.

In various implementations, the thermostat may have a predetermined calibration routine to allow this table to be generated by cycling through each of the modes in a predetermined order. In implementations where the operational table is predefined, a determination that the current is not present in the operational table signals an error. This may be reported to the customer and/or an HVAC contractor as either the table needs to be updated or a fault is causing the current to deviate from what is predefined in the table.

In the example shown in FIG. 6, the table is not predefined, and is instead constructed by the monitoring system. Therefore, at 644, control infers the mode corresponding to the current, which has been determined to not be present in the operational table. For example, this mode may be inferred based on temperature measurements. If an outside ambient air temperature is above a certain threshold, it is likely that a cooling mode has been initiated. If the outside ambient temperature is below a certain threshold, it is likely that a heating mode has been enabled.

Further, the supply air temperature may indicate whether heating or cooling is being performed. And specifically, a difference between the supply air temperature and the return air temperature indicates whether heat is being added to or removed from circulating air. In situations where the supply air and return air temperatures differ by only a small amount, an airflow sensor may be able to determine whether the fan-only mode is engaged. Meanwhile, when the supply air and return air temperatures differ by only a small amount and there is an indication of minimal air low (such as from an airflow sensor), the system is likely in an idle state.

Various other heuristics may be used, such as an inference that a control line current that is more than ten times a lowest measured current corresponds to a cooling mode. This is because the contactor for an air conditioning compressor may draw significantly more current than the components active in an idle system. The time of year and geographical location of the HVAC system may inform the mode inference. For example, a current level that is first seen in October, in a colder climate of the Northern hemisphere, is likely to be related to a call for heating.

In addition, system current data (i.e., the measured currents from current sensors 216 and 264) can be used to infer the operating mode of the HVAC system. Air conditioning, gas furnace, electric heater, and fan-only modes may exhibit distinct system current patterns. For example, air conditioning and fan-only modes may have the same indoor current pattern (including just the blower motor). However, the air conditioning mode will exhibit a significant outdoor system current draw.

A gas furnace has a distinctive system current profile that starts with inducer fan operation, followed by ignition, then a purging (or waiting) period to allow the heat exchanger to heat up, then blower operation. Meanwhile, an electric heater generally draws significantly greater indoor system current than does a gas-powered furnace and also does not have the initial steps (inducer fan, ignition, etc.) associated with a gas furnace.

After the mode is inferred, control continues at 648, where the current level and mode are added to the operational table. Control then continues at 640. At 640, control reports the operational mode that is determined from the table. The reported operational mode may be reflected on the contractor portal 328 or the customer portal 332 of the remote monitoring system 304.

In addition, the table may be updated with information regarding how the present current differs from the stored current level. For example, if, over time, all of the current levels associated with the heating mode are five percent higher than the nominal current level stored in the operational table, the operational table may be adjusted so that the measured current falls in the middle of the range of the stored current level. This may allow for small drifts in current as the HVAC system ages.

At 652, control determines a system condition of the HVAC system. The system condition may include detections of various faults, including those described above. The system condition may include predictions of various faults, as described above. The system condition may also include a reduction in performance or efficiency—while such a condition may also be characterized as a fault, it may be treated separately from a fault when there is no corresponding system component that has actually failed. Control then returns to 604.

Figure 7A:
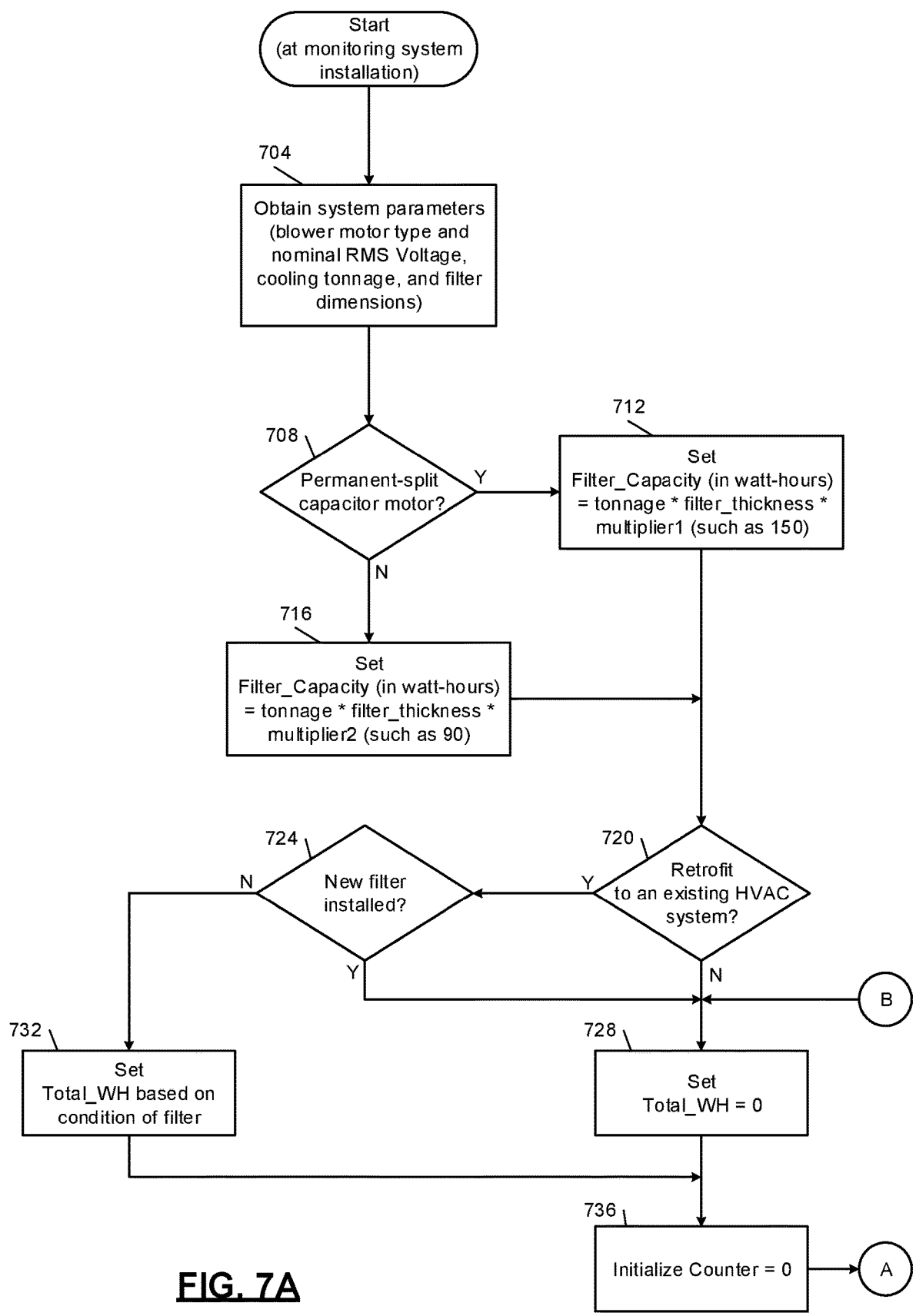
FIGS. 7A-7B are a flowchart of example operation of a monitoring system that determines filter usage based on measured current through a circulator blower.
Figure 7B:
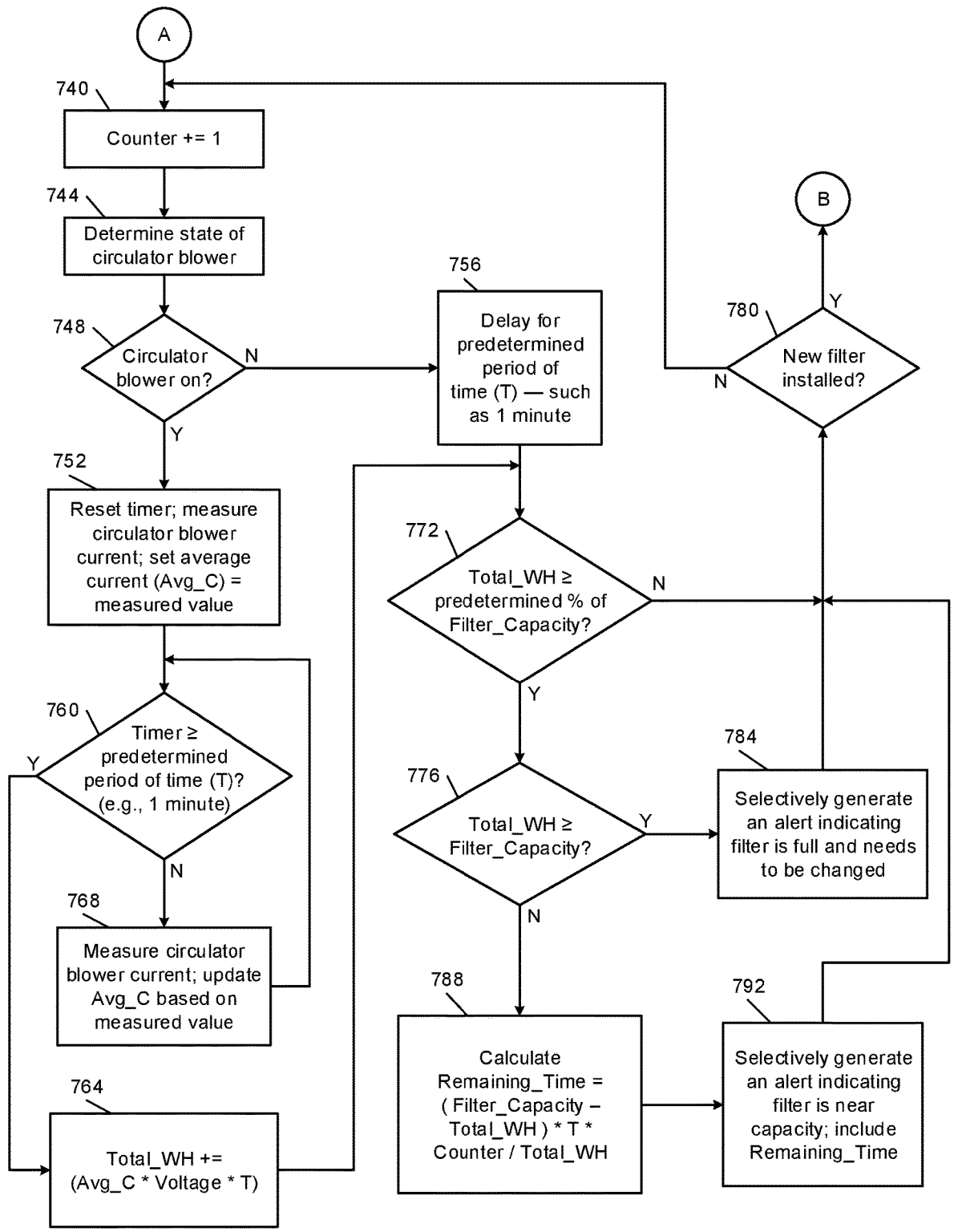

FIGS. 7A and 7B are a flowchart depicting an example method of determining filter usage based on current through a motor of a circulator blower. Although the example method is described below with respect to a filter and a circulator blower in an HVAC system, such as the filter 104 and circulator blower 108, the method may be implemented in other devices that use a fan to draw or push air through a filter. In various implementations, control may be performed by the air handler monitor module 200 or another control device. In other implementations, control may be performed by the remote monitoring system 304 or shared by a combination of the air handler monitor module 200 and the remote monitoring system 304.

Control begins at 704 of FIG. 7A upon the installation of a monitoring system. At 704, control obtains information regarding parameters of the HVAC system—for example, the type of circulator blower motor, the nominal root mean square (RMS) voltage of the circulator blower motor, the cooling tonnage of the HVAC system, and the dimensions of an air filter used in the HVAC system. Control continues with 708 where control determines whether the circulator blower motor is a permanent-split capacitor motor. If 708 is true, control progresses to 712; otherwise, control transfers to 716.

At 712, control sets a capacity of the air filter (Filter_Capacity) using equation 1 below.

$$\text{Filter\_Capacity} = \text{cooling tonnage} * \text{filter thickness} * \text{multiplier1} \quad (1)$$

Multiplier1 is a predetermined value, such as 150, that represents an adjustment factor specific to permanent-split capacitor motors. In some implementations, control may adjust the calculated capacity of the air filer (Filter_Capacity) based on a minimum efficiency reporting value (MERV) rating of the air filter. For example, control may decrease the value of Filter_Capacity for a filter with a high rating—such as MERV 11—and increase the value of Filter_Capacity for a filter with a low rating—such as MERV 5. Control then continues with 720.

At 716, control sets the capacity of the air filter (Filter_Capacity) using equation 2 below.

$$\text{Filter\_Capacity} = \text{cooling tonnage} * \text{filter thickness} * \text{multiplier2} \quad (2)$$

Multiplier2 is a predetermined value, such as 90, that represents an adjustment factor specific to electronically commutated motors. In some implementations, control may adjust the calculated capacity of the air filer (Filter_Capacity) based on the MERV rating of the air filter. Control then continues with 720.

At 720, control determines whether the monitoring system was installed in an existing HVAC system. If so, control progresses to 724; otherwise, the installation of the monitoring system was part of an installation of a new HVAC system and control transfers to 728. At 724, control determines whether a new air filter has been installed. For example, the air handler monitor module 200 may use the filter camera 238 to compare the color of an image of the installed filter to the color of a new filter. In other implementations, the monitoring system may use the remote monitoring system 304 to instruct an operator of the HVAC system to confirm that a new filter has been installed. If presence of a new filter is identified at 724, control continues with 728; otherwise, control transfers to 732. At 728, control sets a cumulative value, in watt-hours, for the filter (Total_WH) to zero. Control then continues with 736.

At 732, control sets Total_WH to a value based on the condition of the installed filter. In an example implementation, the air handler monitor module 200 may use the filter camera 238 to determine the condition of the filter based on the color or light transmittance of the filter. For example, the air handler monitor module 200 may compare the color of the image of the installed filter to colors of filters with known total watt-hours. In other implementations, the monitoring system may use the remote monitoring system 304 to instruct the operator of the HVAC system to provide the condition of the installed filter. For example, the remote monitoring system 304 may display a set of images of filters on the contractor device 320 and/or the customer device 324 and prompt the operator to select the image that most closely matches the installed filter—for example, an image with the same or similar color as the installed filter. Based on the operator's selection, the monitoring system sets Total_WH to a value associated with the selected image. Control then continues with 736.

At 736, control initializes a counter to zero. Control then continues with 740 of FIG. 7B. At 740 of FIG. 7B, control increments the counter by one. Control then continues with 744 where control determines the state of the circulator blower—such as on or off. Control then continues with 748. If the circulator blower is on, control progresses to 752; otherwise, control transfers to 756 where control delays for a predetermined period of time (T), such as one minute, and then control continues with 772.

At 752, control starts and resets a timer to zero, measures a current through the motor of the circulator blower 108, and initializes a value indicating average RMS current through the motor of the circulator blower 108 (Avg_C) to the measured current. Control then continues with 760 where control determines whether the timer is greater than or equal to the predetermined period of time (T). If so, control progresses to 764; otherwise, control transfers to 768 where control measures the current through the circulator blower motor and updates the average current through the circulator blower motor (Avg_C) based on the measured current. Control then returns to 760.

At 764, control increases Total_WH using equation 3 below.

$$\text{Total\_WH} += \text{Avg\_C} * \text{Voltage} * T \quad (3)$$

Voltage is the nominal RMS voltage supplied to the motor of the circulator blower 108. Control then continues with 772.

Equation 3 above is based on the presence of a typical level of particulate matter in air returned to the air handler unit 136. The monitoring system may adjust the value added to the total of watt-hours of the filter each cycle based on a particulate matter level specific to the HVAC system. For example, the monitoring system may multiply the quantity (Avg_C*Voltage*T) by a correction factor. The correction factor is a ratio of the particulate matter level specific to the HVAC system to the typical particulate matter level. In other words, if the particulate matter level specific to the HVAC system is 50% greater than the nominal level, the correction factor will be 1.5. In various implementations, the monitoring system may use a particulate matter sensor located within the building to measure the particulate matter level specific to the HVAC system. The particulate matter level may be measured and the correction factor adjusted each time the monitoring system updates the total watt-hours of the filter (Total_WH). In other implementations, the monitoring system may prompt the operator to provide the particulate matter level specific to the HVAC system. In such implementations, the correction factor is only adjusted in response to the operator providing a new particulate matter level. This level may be supplied to the operator by a sensor or determined subjectively by the operator, such as based on how quickly dust accumulates on a surface.

At 772, control determines whether the filter has reached a predetermined usage level, such as 90% of the capacity of the filter. In other words, control may determine if Total_WH is greater than or equal to 90% of Filter_Capacity. If so, control progresses to 776; otherwise, control transfers to 780. At 776, control determines if the filter is full. For example, control determines whether the total of watt-hours of the filter (Total_WH) is greater than or equal to the capacity of the filter (Filter_Capacity). If so, control progresses to 784; otherwise, control transfers to 788. At 784, control selectively generates an alert indicating the filter is full and needs to be changed. Control then continues with 780. In various implementations, control may only generate the alert once per day—for example, the first time that control reaches 784 each day. In other implementations, control may generate the alert every time control reaches 784.

At 788, control determines a remaining life of the filter (Remaining_Time) based on the capacity of the filter and past filter usage. For example, control may calculate Remaining_Time using equation 4 below.

$$\text{Remaining\_Time} = \frac{(\text{Filter\_Capicity} - \text{Total\_WH}) * T * \text{Counter}}{\text{Total\_WH}} \quad (4)$$

The product of the predetermined period of time and the counter (T*Counter) represents the total length of time that the filter has been installed. Control then continues with 792 where control selectively generates an alert that indicates the filter is near capacity and includes the remaining life of the filter (Remaining_Time). Control then continues with 780. In various implementations, control may only generate the alert once per day—for example, the first time that control reaches 792 each day. In other implementations, control may generate the alert every time control reaches 792.

At 780, control determines if a new filter has been installed. If so, control progresses to 728 of FIG. 7A; otherwise, control returns to 740.

Figure 8A:
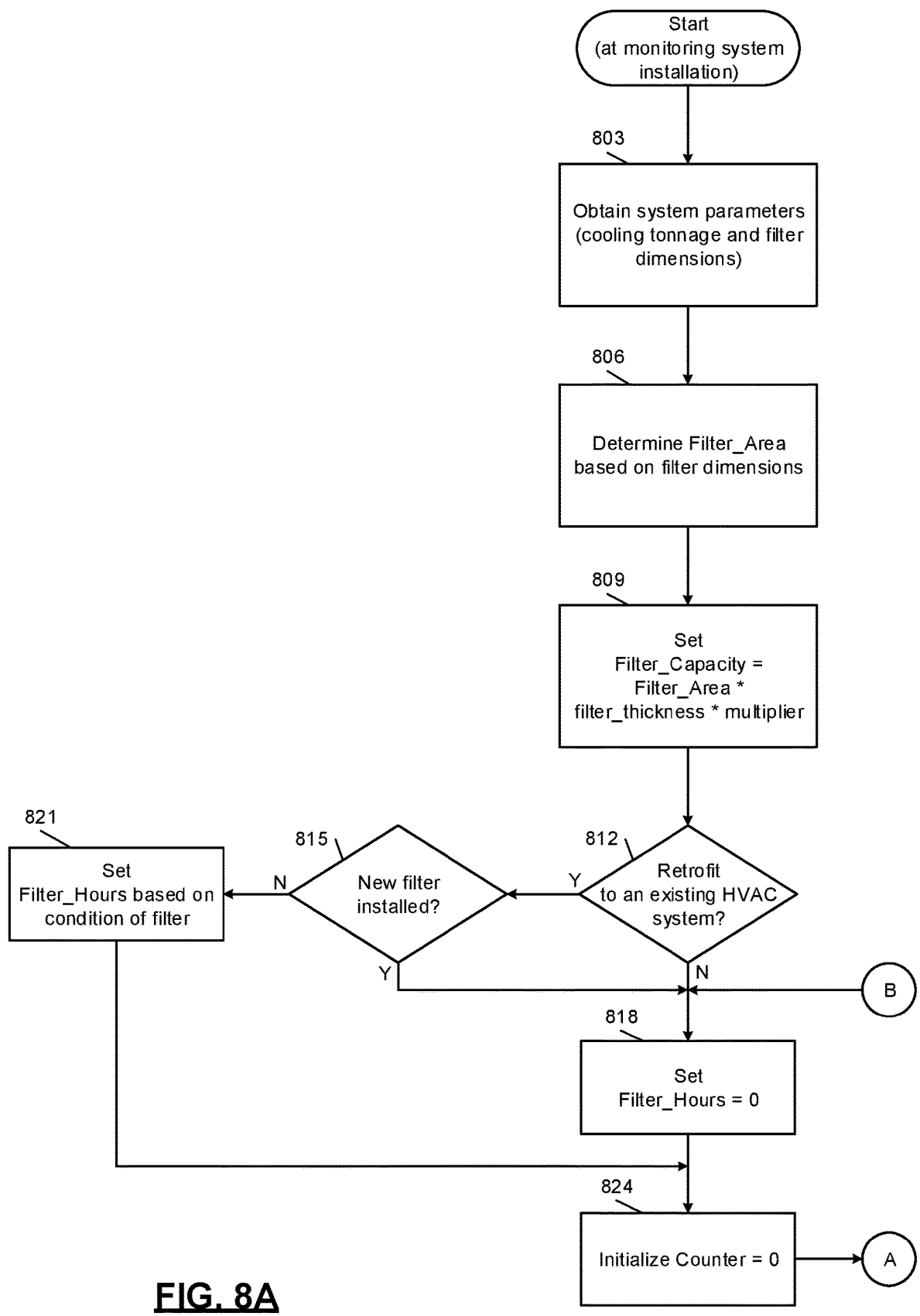
FIGS. 8A-8B are a flowchart of example operation of a monitoring system that determines filter usage based on operating modes of an HVAC system.
Figure 8B:
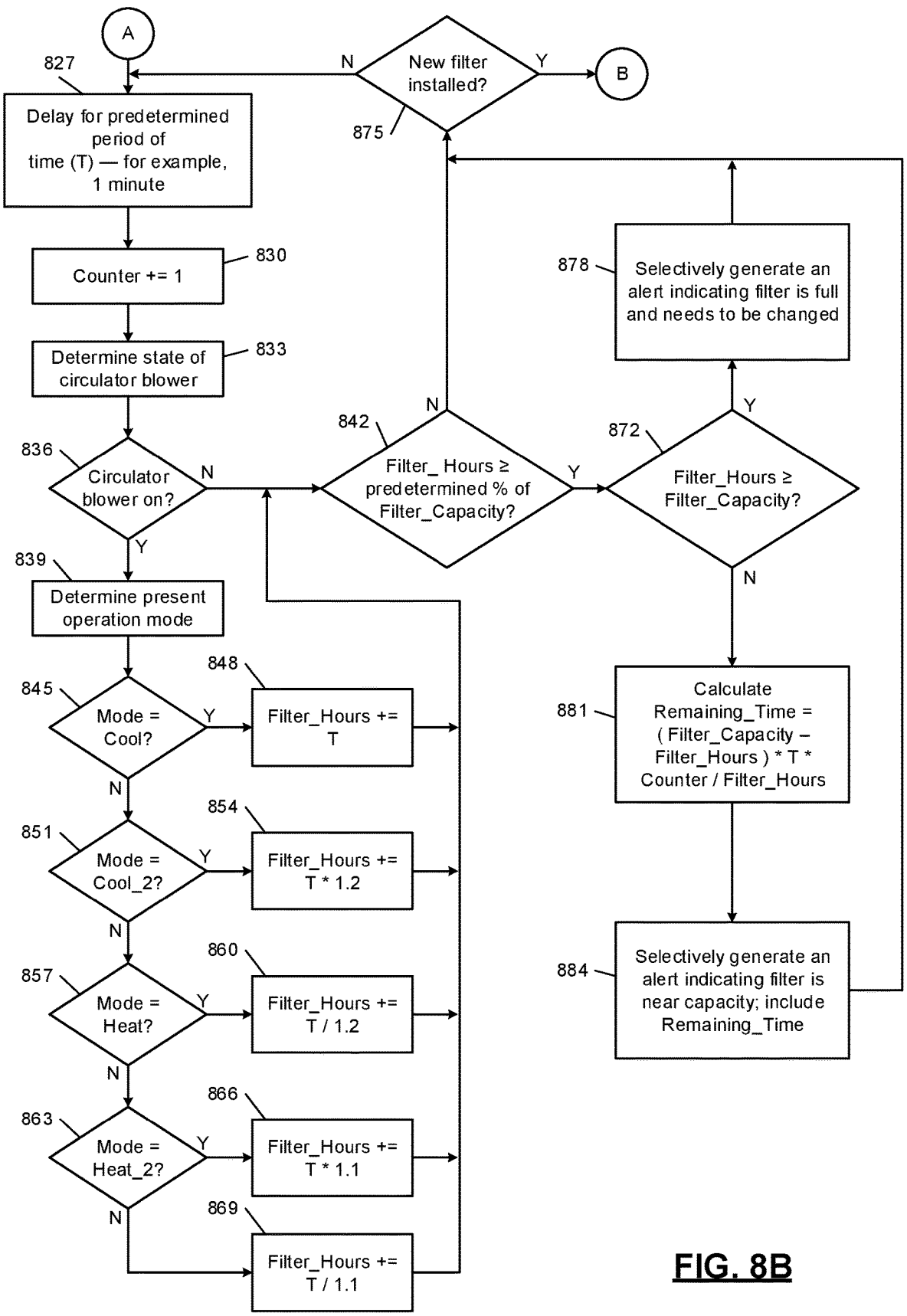

FIGS. 8A and 8B are a flowchart depicting an example method of determining filter usage based on operational modes of an HVAC system. In various implementations, control may be performed by the air handler monitor module 200. In other implementations, control may be performed by the thermostat 208 or the remote monitoring system 304 or shared by a combination of the air handler monitor module 200, the thermostat 208, and the remote monitoring system 304.

Control begins at 803 of FIG. 8A upon the installation of a monitoring system. At 803, control obtains information regarding parameters of the HVAC system—for example, the cooling tonnage of the HVAC system and the dimensions of a filter used in the HVAC system. Control continues with 806 where control determines an area of the filter (Filter_Area) based on the dimensions of the filter. Control then continues with 809 where a capacity of the filter (Filter_Capacity) is set. For example control may use equation 5 below to calculate the capacity of the filter.

Filter_Capacity=Filter_Area*filter thickness*multiplier   (5)

The multiplier is a predetermined value based on an average filter life, such as 750 hours, divided by an average filter area, such as 150 in². In some implementations, control may adjust the calculated capacity of the air filer (Filter_Capacity) based on a MERV rating of the air filter. Control then continues with 812.

At 812, control determines whether the monitoring system was installed into an existing HVAC system. If so, control progresses to 815; otherwise, the installation of the monitoring system was part of an installation of a new HVAC system and control transfers to 818. At 815, control determines whether a new air filter has been installed. For example, the air handler monitor module 200 may use the filter camera 238 to compare the color of an image of the installed filter to the color of a new filter. In other implementations, the monitoring system may use the remote monitoring system 304 to instruct an operator of the HVAC system to confirm that a new filter has been installed. If presence of a new filter is identified at 815, control progresses to 818; otherwise, control transfers to 821. At 818, control sets a filter usage (Filter_Hours) to zero. Control then continues with 824.

At 821, control sets the filter usage (Filter_Hours) to a value based on the condition of the installed filter. In an example implementation, the air handler monitor module 200 may use the filter camera 238 to determine the condition of the filter based on the color of the filter. For example, the air handler monitor module 200 may compare the color of the image of the installed filter to colors of filters with known total watt-hours. In other implementations, the monitoring system may use the remote monitoring system 304 to instruct the operator of the HVAC system to provide the condition of the installed filter. For example, the remote monitoring system 304 may display a set of images of filters on the contractor device 320 and/or the customer device 324 and prompt the operator to select the image that most closely matches the installed filter—for example, an image with the same or similar color as the installed filter. Based on the operator's selection, the monitoring system sets the filter usage (Filter_Hours) to a value associated with the selected image. Control then continues with 824.

At 824, control initializes a counter to zero. Control then continues with 827 of FIG. 8B. At 827 of FIG. 8B, control delays for a predetermined period of time (T), such as one minute. Control then continues with 830 where control increments the counter by one. Control then continues with 833 where control determines the state of the circulator blower—such as on or off. Control then continues with 836. If the circulator blower is on, control progresses to 839; otherwise, control transfers to 842.

At 839, control determines the present operation mode of the HVAC system. For example, control may determine the operation mode based on control line current using the method disclosed in FIG. 6. Alternatively, control may receive the present operating mode of the HVAC system from the thermostat 208. Further, the filter monitor module 306 may determine the present operation mode of the HVAC based on HVAC power data from a power monitor—such as a whole home power monitor. At 845, control determines whether the current mode is "Cool." If so, control progresses to 848; otherwise, control transfers to 851. At 848, control updates the filter usage (Filter_Hours) by adding the predetermined period of time (T) to the present value of Filter_Hours. Control then continues with 842.

At 851, control determines whether the current mode is "Cool_2"—for example secondary or extra cooling. If so, control progresses to 854; otherwise, control transfers to 857. At 854, control updates the filter usage (Filter_Hours) by adding the product of the predetermined period of time (T) and a first adjustment factor, such as 1.2, to the present value of Filter_Hours. Control then continues with 842.

At 857, control determines whether the current mode is "Heat." If so, control progresses to 860; otherwise, control transfers to 863. At 860, control updates the filter usage (Filter_Hours) by adding the result of dividing the predetermined period of time (T) by the first adjustment factor to the present value of Filter_Hours. Control then continues with 842.

At 863, control determines whether the current mode is "Heat_2"—for example, secondary or extra heating. If so, control progresses to 866; otherwise, control transfers to 869. At 866, control updates the filter usage (Filter_Hours) by adding the product of the predetermined period of time (T) and a second adjustment factor, such as 1.1, to the present value of Filter_Hours. Control then continues with 842. At 869, control updates the filter usage (Filter_Hours) by adding the result of dividing the predetermined period of time (T) by the second adjustment factor to the present value of Filter_Hours. Control then continues with 842.

In elements 848, 854, 860, 866, and 869 of FIG. 8B, the increases of the filter usage (Filter_Hours) are based on the presence of a typical level of particulate matter in air returned to the air handler unit 136. The monitoring system may adjust the values added to the filter usage (Filter_Hours) each cycle based on a particulate matter level specific to the HVAC system. For example, the monitoring system may multiply the values to be added to the filter usage (Filter_Hours) by a correction factor. The correction factor may be calculated as a ratio of the particulate matter level specific to the HVAC system to the typical particulate matter level. In other words, if the particulate matter level specific to the HVAC system is 50% greater than the nominal level, the correction factor will be 1.5. In various implementations, the monitoring system may use a particulate matter sensor located within the building to measure the particulate matter level specific to the HVAC system. The particulate matter level may be measured and the correction factor adjusted each time the monitoring system updates the filter usage (Filter_Hours). In other implementations, the monitoring system may prompt the operator to provide the particulate matter level specific to the HVAC system. In such implementations, the correction factor is only adjusted in response to the operator providing a new particulate matter level.

At 842, control determines whether the filter has reached a predetermined usage level, such as 90% of the capacity of the filter. In other words, control may determine if Filter_Hours is greater than or equal to 90% of Filter_Capacity. If so, control progresses to 872; otherwise, control transfers to 875. At 872, control determines if the filter is full. For example, control determines whether the filter usage (Filter_Hours) is greater than or equal to the capacity of the filter (Filter_Capacity). If the filter is full, control progresses to 878; otherwise, control transfers to 881. At 878, control selectively generates an alert indicating the filter is full and needs to be changed. In various implementations, control may only generate the alert once per day—for example, the first time that control reaches 878 each day. In other implementations, control may generate the alert every time control reaches 878. Control then continues with 875.

At 881, control determines a remaining life of the filter (Remaining_Time) based on the capacity of the filter and past filter usage. For example, control may calculate Remaining_Time using equation 6 below.

$$\text{Remaining\_Time} = \frac{(\text{Filter\_Capacity} - \text{Filter\_Hours}) * T * \text{Counter}}{\text{Filter\_Hours}} \quad (6)$$

The product of the predetermined period of time and the counter (T*Counter) represents the total length of time that the filter has been installed. Control then continues with 884 where control selectively generates an alert that indicates the filter is near capacity and includes the remaining life of the filter (Remaining_Time). In various implementations, control may only generate the alert once per day—for example, the first time that control reaches 884 each day. In other implementations, control may generate the alert every time control reaches 884. At 875, control determines if a new filter has been installed. If so, control progresses to 818 of FIG. 8A; otherwise, control returns to 827.

Figure 9A:
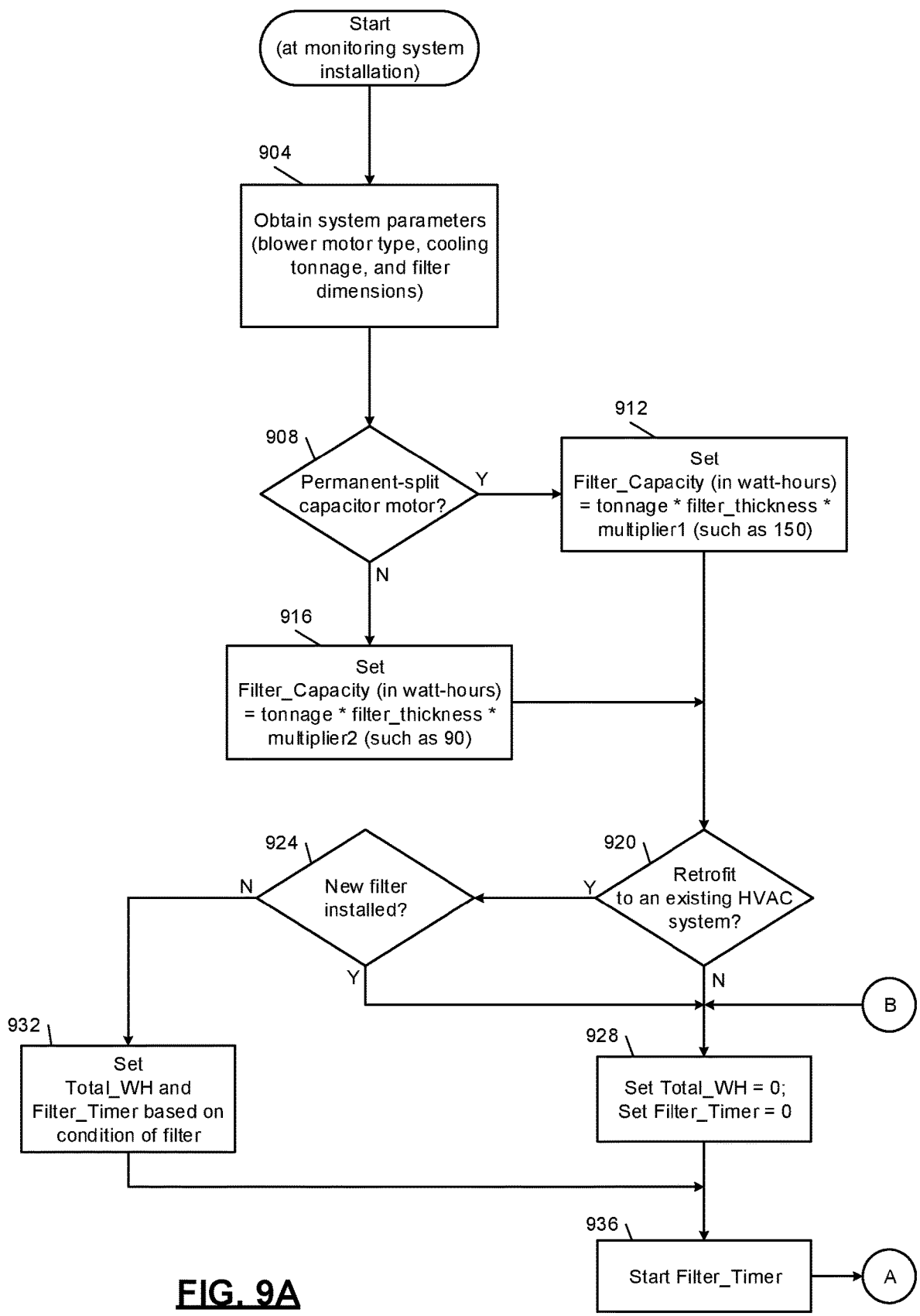
FIGS. 9A-9B are a flowchart of example operation of a monitoring system that determines filter usage based on power consumed by a motor of a circulator blower.
Figure 9B:
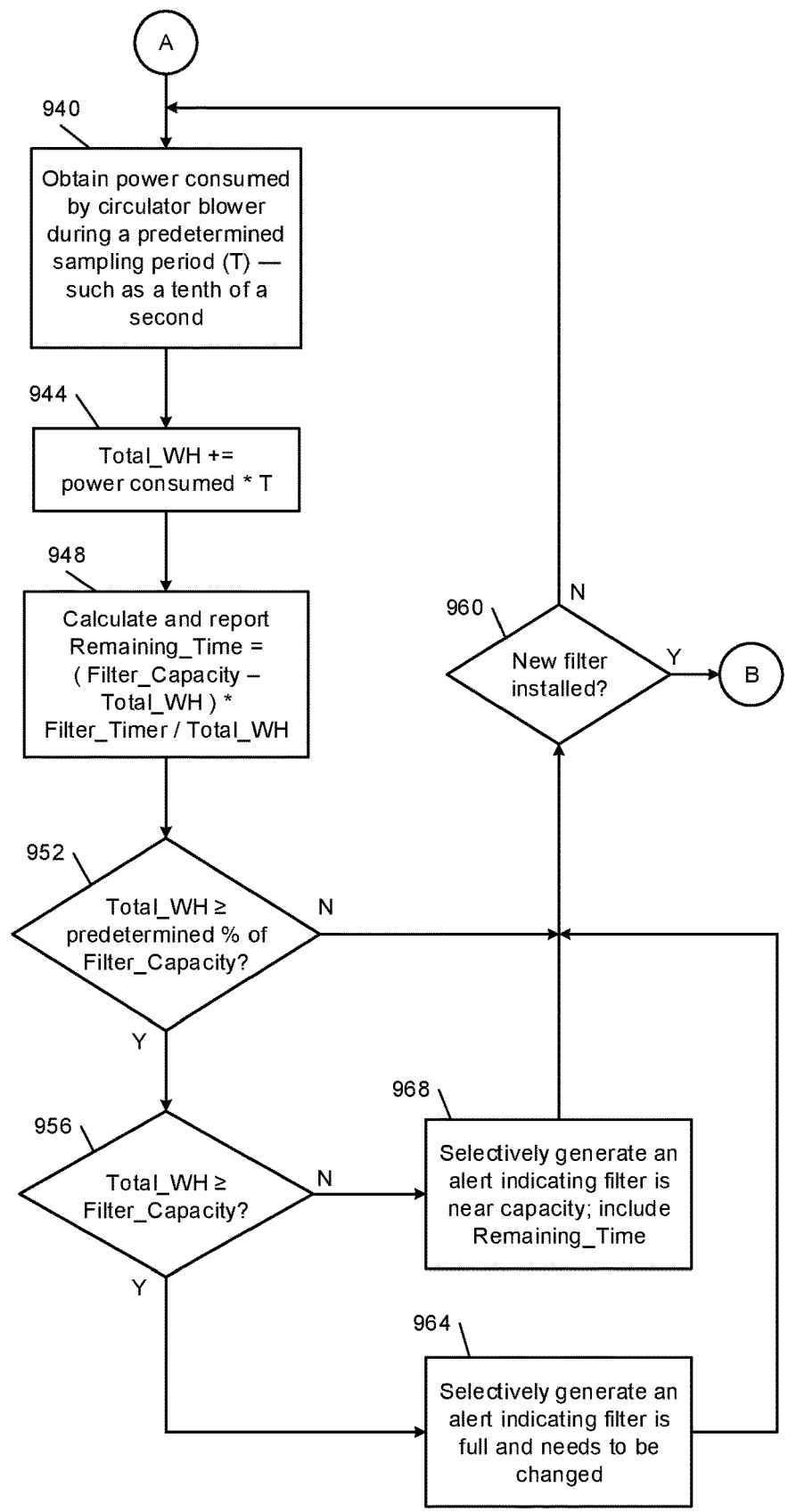

FIGS. 9A and 9B are a flowchart depicting an example method of determining filter usage based on power consumed by a motor of a circulator blower. Although the example method is described below with respect to a filter and a circulator blower in an HVAC system, such as the filter 104 and circulator blower 108, the method may be implemented in other devices that use a fan to draw or push air through a filter. In various implementations, control may be performed by the air handler monitor module 200 or another control device. In other implementations, control may be performed by the remote monitoring system 304 or shared by a combination of the air handler monitor module 200 and the remote monitoring system 304.

Control begins at 904 of FIG. 9A upon the installation of a monitoring system. At 904, control obtains information regarding parameters of the HVAC system—for example, the type of circulator blower motor, the cooling tonnage of the HVAC system, and the dimensions of an air filter used in the HVAC system. Control continues with 908 where control determines whether the circulator blower motor is a permanent-split capacitor motor. If so, control progresses to 912; otherwise, control transfers to 916.

At 912, control sets a capacity, in watt-hours, of the air filter (Filter_Capacity) using equation 1, as discussed with respect to FIG. 7A above. Control then continues with 920. At 916, control sets the capacity, in watt-hours, of the air filter (Filter_Capacity) using equation 2, as discussed with respect to FIG. 7A above. In some implementations, control may adjust the calculated capacity of the air filer (Filter_Capacity) based on a MERV rating of the air filter. Control then continues with 920.

At 920, control determines whether the monitoring system was installed in an existing HVAC system. If so, control progresses to 924; otherwise, the installation of the monitoring system was part of an installation of a new HVAC system and control transfers to 928. At 924, control determines whether a new air filter has been installed. If presence of a new filter is identified at 924, control continues with 928; otherwise, control transfers to 932. At 928, control sets a cumulative value, in watt-hours, for the filter (Total_WH) to zero and sets a timer (Filter_Timer) to zero. The timer is used to track the length of time that the filter has been installed in the HVAC system. Control then continues with 936.

At 932, control sets Total_WH to a value based on the condition of the installed filter and sets the timer (Filter_Timer) to a value that equals an installation length that corresponds to the condition of the installed filter. Control then continues with 936.

At 936, control starts the timer. Control then continues with 940 of FIG. 9B. At 940 of FIG. 9B, control obtains the power consumed by the circulator blower during a predetermined sampling period (T), such as a tenth of a second. For example, control may use a power chip of the air handler monitor module 200 to measure the real power consumed by the motor of the circulator blower 108. In other implementations, the power may be apparent power, and may be calculated as the product of voltage and current. In yet other implementations, control may receive the power consumed by the circulator blower from an energy monitor, such as a whole home energy monitor.

Control then continues with 944 where control increases Total_WH using equation 7 below.

$$\text{Total\_}WH\mathrel{+}=\text{power consumed}*T \qquad (7)$$

Equation 7 above is based on the presence of a typical level of particulate matter in air returned to the air handler unit 136. As discussed above, the monitoring system may adjust the value added to the total watt-hours of the filter (Total_WH) based on a particulate matter level specific to the HVAC system. Control then continues with 948.

At 948, control determines a remaining life of the filter (Remaining_Time) based on the capacity of the filter and past filter usage. For example, control may calculate Remaining_Time using equation 8 below.

$$\text{Remaining\_Time} = \frac{(\text{Filter\_Capacity} - \text{Total\_WH}) * \text{Filter\_Timer}}{\text{Total\_WH}} \qquad (8)$$

Filter_Timer represents the length of time that the filter has been installed in the HVAC system. Control may also report the remaining time for an operator or contractor to view, such as in a mobile phone application. Control then continues with 952.

At 952, control determines whether the filter has reached a predetermined usage level, such as 90% of the capacity of the filter. In other words, control may determine if Total_WH is greater than or equal to 90% of Filter_Capacity. If so, control progresses to 956; otherwise, control transfers to 960. At 956, control determines if the filter is full. For example, control determines whether the total of watt-hours of the filter (Total_WH) is greater than or equal to the capacity of the filter (Filter_Capacity). If so, control progresses to 964; otherwise, control transfers to 968. At 964, control selectively generates an alert indicating the filter is full and needs to be changed. Control then continues with 960. In various implementations, control may only generate the alert once per day—for example, the first time that control reaches 964 each day. In other implementations, control may generate the alert every time control reaches 964.

At 968, control selectively generates an alert that indicates the filter is near capacity and includes the remaining life of the filter (Remaining_Time). Control then continues with 960. In various implementations, control may only generate the alert once per day—for example, the first time that control reaches 968 each day. In other implementations, control may generate the alert every time control reaches 968. At 960, control determines if a new filter has been installed. If so, control progresses to 928 of FIG. 9A; otherwise, control returns to 940.

The remaining life of the filter (Remaining_Time) may be made available to an operator of the HVAC system, regardless of the value of the total of watt-hours of the filter (Total_WH). For example, Remaining_Time may be presented to the operator in the contractor portal 328 and/or the customer portal 332. Additionally or alternatively, a filter usage, such as a percentage, based on the total of watt-hours of the filter (Total_WH) and the capacity of the filter (Filter_Capacity) may be presented to the operator in the contractor portal 328 and/or the customer portal 332.

Figure 10A:
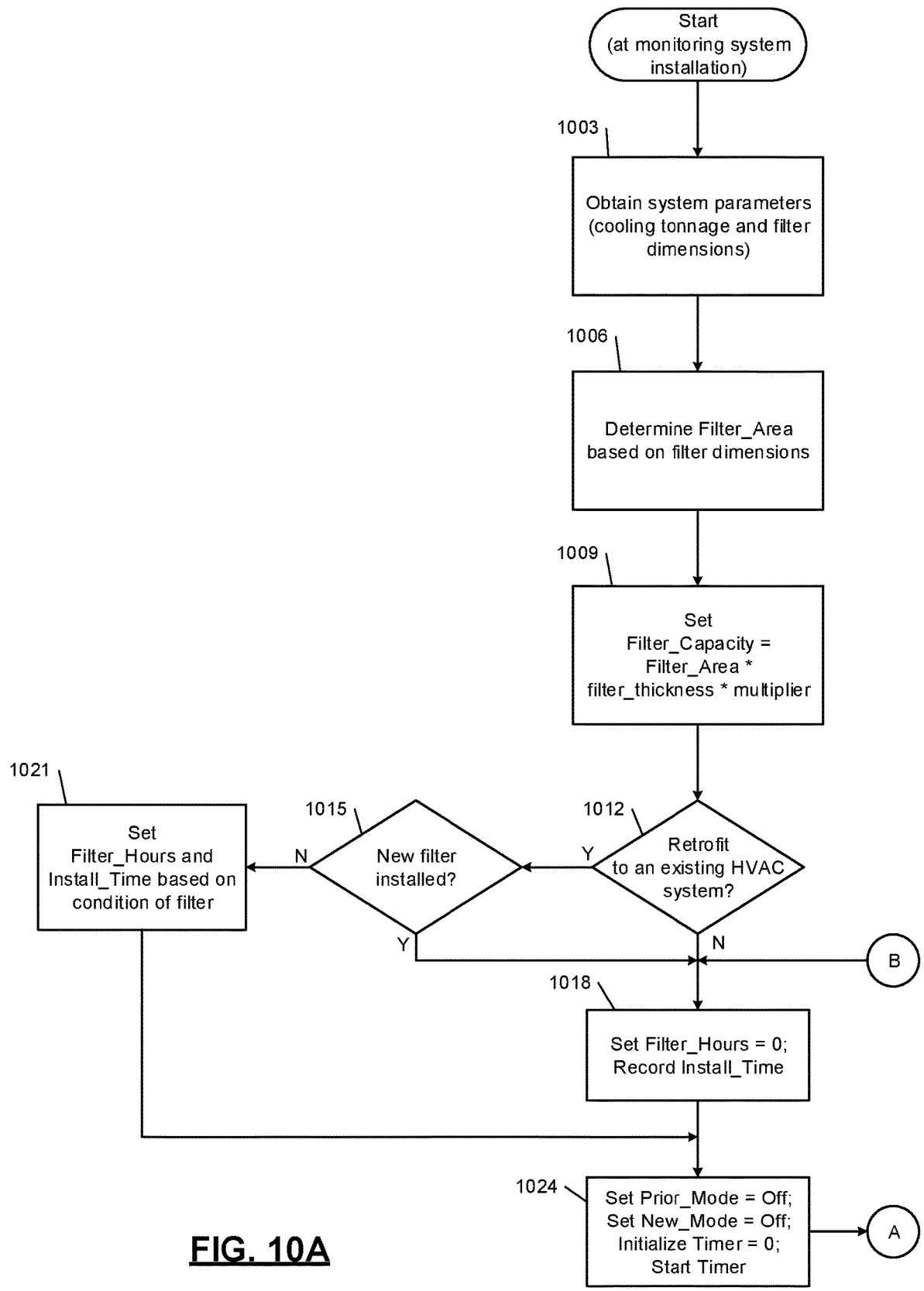
FIGS. 10A-10B are a flowchart of example operation of a monitoring system that determines filter usage based on received data indicating operation of an HVAC system.
Figure 10B:
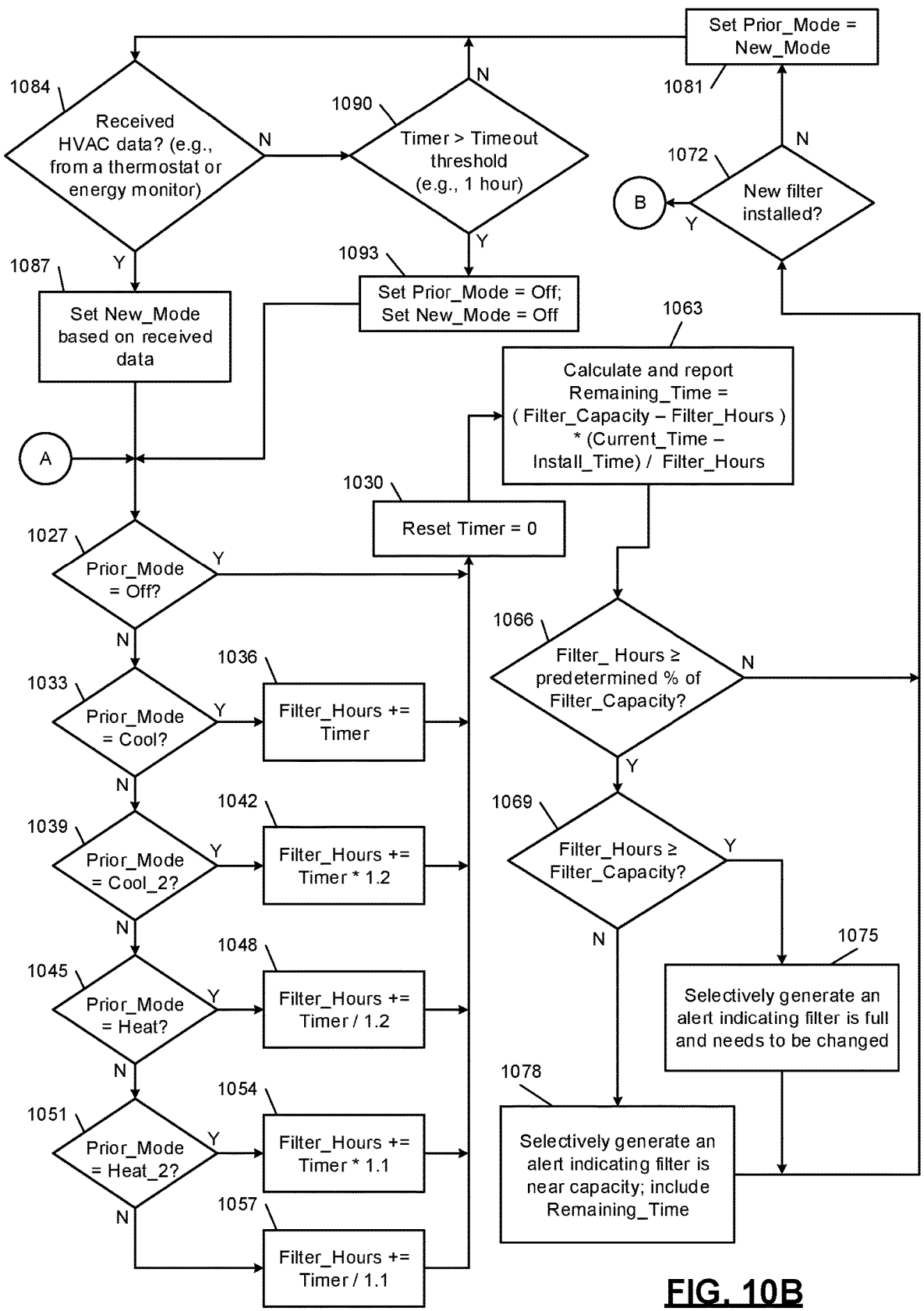

FIGS. 10A and 10B are a flowchart depicting an example method of determining filter usage based on received HVAC data—for example, from a thermostat or an energy monitor. In various implementations, control may be performed by the air handler monitor module 200. In other implementations, control may be performed by the thermostat 208 or the filter monitor module 306 or the remote monitoring system 304 or shared by a combination of the air handler monitor module 200, the thermostat 208, the filter monitor module 306, and the remote monitoring system 304.

Control begins at 1003 of FIG. 10A upon the installation of a monitoring system. At 1003, control obtains information regarding parameters of the HVAC system—for example, the cooling tonnage of the HVAC system and the dimensions of a filter used in the HVAC system. Control then continues with 1006 where control determines an area of the filter (Filter_Area) based on the dimensions of the filter. Control then continues with 1009 where a capacity of the filter (Filter_Capacity) is set. For example, control may use equation 5, as discussed with respect to FIG. 8A above, to calculate the capacity of the filter. In some implementations, control may adjust the calculated capacity of the air filer (Filter_Capacity) based on a MERV rating of the air filter. Control then continues with 1012.

At 1012, control determines whether the monitoring system was installed into an existing HVAC system. If so, control progresses to 1015; otherwise, the installation of the monitoring system was part of an installation of a new HVAC system and control transfers to 1018. At 1015, control determines whether a new air filter has been installed. If presence of a new filter is identified at 1015, control progresses to 1018; otherwise, control transfers to 1021. At 1018, control sets a filter usage (Filter_Hours) to zero. Control also records the date and time that the filter was installed as Install_Time. Control then continues with 1024.

At 1021, control sets the filter usage (Filter_Hours) to a value based on the condition of the installed filter and estimates the installation date and time of the filter (Install_Time) based on the condition of the installed filter. Control then continues with 1024.

At 1024, control sets a previous mode of operation (Prior_Mode) and a new/current mode of operation (New_Mode) of the HVAC system to "Off." At 1024, control also initializes a timer to zero and then starts the timer. Control then continues with 1027 of FIG. 10B.

At 1027 of FIG. 10B, control determines whether the previous mode of operation (Prior_Mode) is "Off". If so, control progresses to 1030; otherwise, control transfers to 1033.

At 1033, control determines whether the previous mode of operation (Prior_Mode) is "Cool." If so, control progresses to 1036; otherwise, control transfers to 1039. At 1036, control updates the filter usage (Filter_Hours) by adding the value of the timer to the present value of Filter_Hours. Control then continues with 1030.

At 1039, control determines whether the previous mode of operation (Prior_Mode) is "Cool_2"—for example secondary or extra cooling. If so, control progresses to 1042; otherwise, control transfers to 1045. At 1042, control updates the filter usage (Filter_Hours) by adding the product of the value of the timer and a first adjustment factor, such as 1.2, to the present value of Filter_Hours. Control then continues with 1030.

At 1045, control determines whether the previous mode of operation (Prior_Mode) is "Heat." If so, control progresses to 1048; otherwise, control transfers to 1051. At 1048, control updates the filter usage (Filter_Hours) by adding the result of dividing the value of the timer by the first adjustment factor to the present value of Filter_Hours. Control then continues with 1030.

At 1051, control determines whether the previous mode of operation (Prior_Mode) is "Heat_2"—for example, secondary or extra heating. If so, control progresses to 1054; otherwise, the present operation mode is a fan only mode and control transfers to 1057. At 1054, control updates the filter usage (Filter_Hours) by adding the product of the value of the timer and a second adjustment factor, such as 1.1, to the present value of Filter_Hours. Control then continues with 1030. At 1057, control updates the filter usage (Filter_Hours) by adding the result of dividing the value of the timer by the second adjustment factor to the present value of Filter_Hours. Control then continues with 1030.

In elements 1036, 1042, 1048, 1054, and 1057 of FIG. 10B, the increases of the filter usage (Filter_Hours) are based on the presence of a typical level of particulate matter in air returned to the air handler unit 136. As previously discussed, the monitoring system may adjust the values added to the filter usage (Filter_Hours) based on a particulate matter level specific to the HVAC system.

At 1030, control resets the timer to zero. Control then continues with 1063. At 1063, control determines and reports a remaining life of the filter (Remaining_Time) based on the capacity of the filter and past filter usage. For example, control may calculate Remaining_Time using equation 9 below.

life of the filter (Remaining_Time). In various implementations, control may only generate the alert once per day—for example, the first time that control reaches 1078 each day. In other implementations, control may generate the alert every time control reaches 1078. Control then continues with 1072.

At 1072, control determines if a new filter has been installed. If so, control progresses to 1018 of FIG. 10A; otherwise, control transfers to 1081. At 1081, control sets the previous operation mode (Prior_Mode) to the new operation mode (New_Mode). Control then continues with 1084.

At 1084, control determines whether HVAC data has been received. In various implementations, control may receive HVAC data—for example, a present operation mode of the HVAC system—from a thermostat, such as the thermostat 208. Alternatively, control may receive HVAC power data that corresponds to the present operation mode of the HVAC system from an energy monitor, such as a whole home energy monitor. If control determines that HVAC data has been received, control progresses to 1087; otherwise, control transfers to 1090. At 1087 control sets the new operation mode (New_Mode) to a value based on the received data. For example, control may set New_Mode to "Cool," "Cool_2," "Heat," "Heat_2," "Off," or to a value that represents a fan only operation mode, such as "Fan." Control then continues with 1027.

At 1090, control determines whether the value of the timer is greater than a timeout threshold—for example, one hour. This may indicate that communications have been lost with the thermostat or energy monitor. If the timer exceeds the threshold, control progresses to 1093; otherwise, control returns to 1084. At 1093, control sets both the previous mode of operation (Prior_Mode) and the new mode of operation (New_Mode) to "Off." This encodes the assumption that the HVAC system turned off soon after the last communication was received. Other assumptions may instead be encoded, such as that the HVAC system turned off after a period of time, such as 30 minutes, or that the HVAC system is still running in its prior mode. Control then continues with 1027.

Figure 11A:
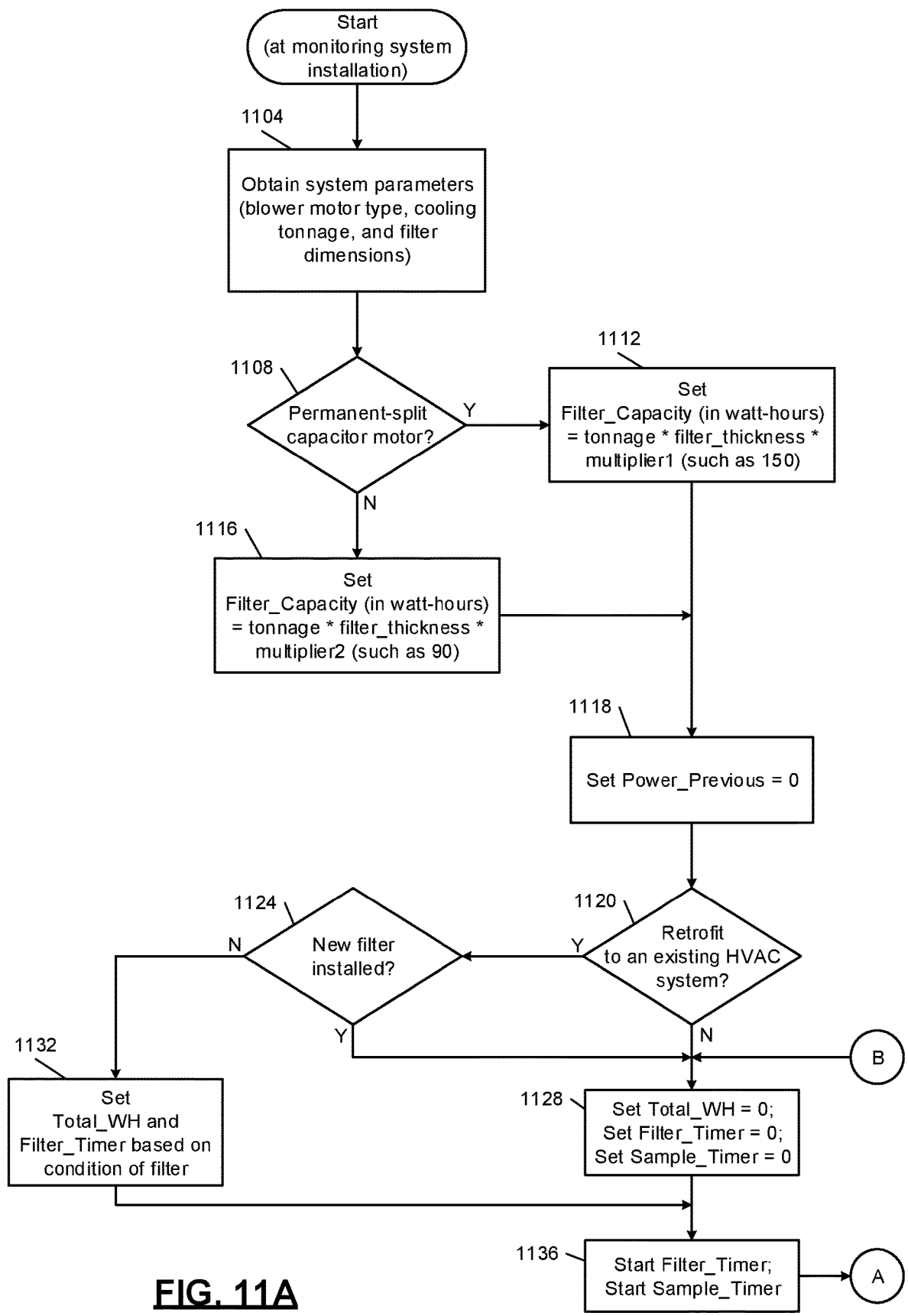
FIGS. 11A-11B are a flowchart of example operation of a monitoring system that determines filter usage based on received data that indicates power consumed by a motor of a circulator blower.
Figure 11B:
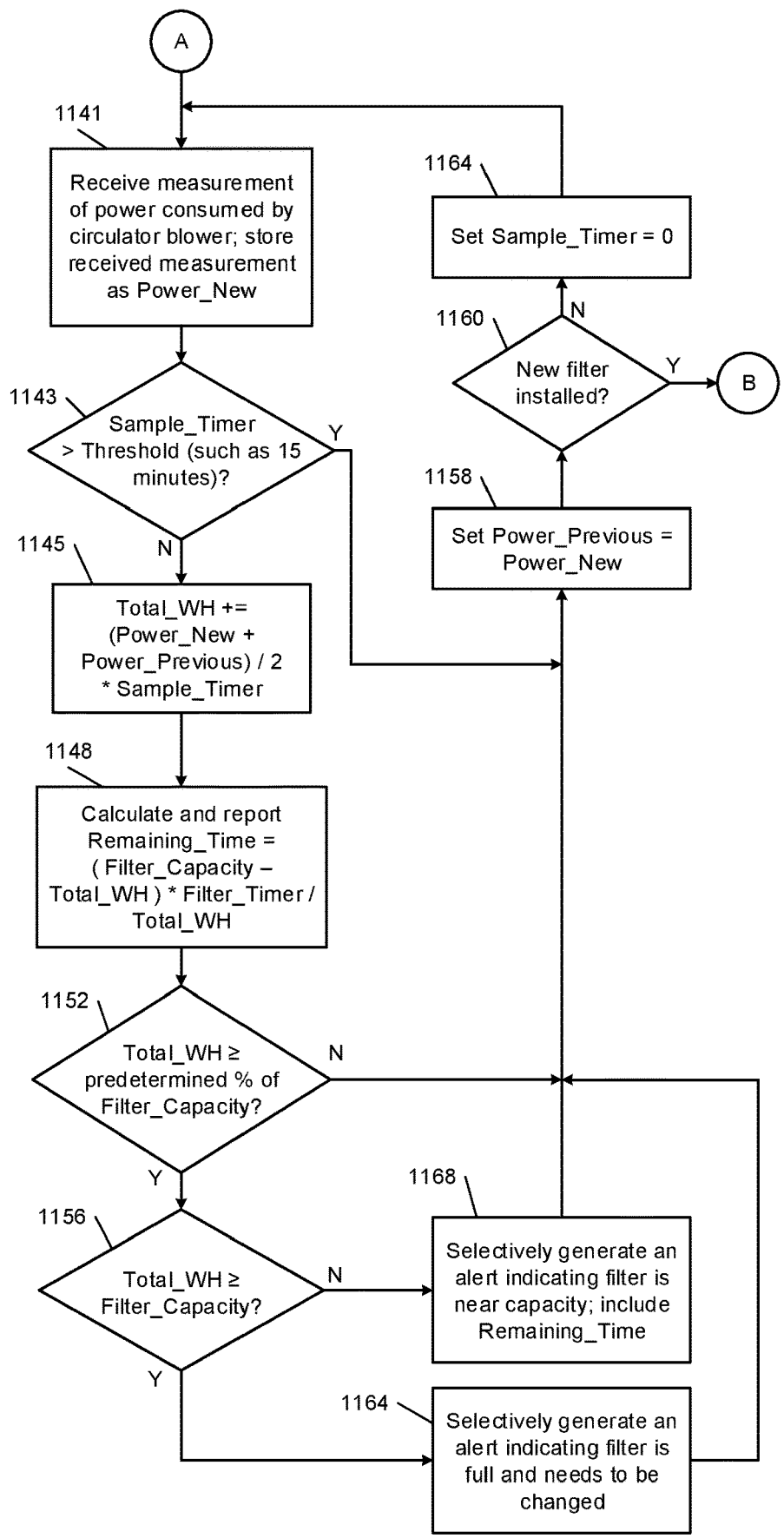

FIGS. 11A and 11B are a flowchart depicting an example method of determining filter usage based on received data that indicates power consumed by a motor of a circulator $$\text{Remaining\_Time} = \frac{(\text{Filter\_Capacity} - \text{Filter\_Hours}) * (\text{Current\_Time} - \text{Install\_Time})}{\text{Filter\_Hours}} \qquad (9)$$

Control then continues with 1066.

At 1066, control determines whether the filter has reached a predetermined usage level, such as 90% of the capacity of the filter. In other words, control may determine if Filter_Hours is greater than or equal to 90% of Filter_Capacity. If so, control progresses to 1069; otherwise, control transfers to 1072. At 1069, control determines if the filter is full. For example, control determines whether the filter usage (Filter_Hours) is greater than or equal to the capacity of the filter (Filter_Capacity). If so, control progresses to 1075; otherwise, control transfers to 1078.

At 1075, control selectively generates an alert indicating the filter is full and needs to be changed. In various implementations, control may only generate the alert once per day—for example, the first time that control reaches 1075 each day. In other implementations, control may generate the alert every time control reaches 1075. Control then continues with 1072.

At 1078, control selectively generates an alert that indicates the filter is near capacity and includes the remaining blower. In various implementations, control may be performed by the remote monitoring system 304. In other implementations, control may be performed by a combination of the remote monitoring system 304 and the air handler monitor module 200 or another control device.

Elements 1104, 1108, 1112, 1116, 1120, 1124, 1132, 1128, and 1136 may be implemented similarly to elements 904, 908, 912, 916, 920, 924, 932, 928, and 936, respectively, of FIG. 9A. However, in FIG. 11A, control progresses to 1118 after setting the capacity of the filter (Filter_Capacity) at either 1112 or 1116. At 1118, control sets a previously measured power consumed by the motor of the circulator blower (Power_Previous) to zero. Control then progresses to 1120. At 1128, in addition to setting Total_WH and Filter_Timer to zero, control sets a timer that represents a length of time between received power measurements (Sample_Timer) to zero. At 1136, control starts both Filter_Timer and Sample_Timer. Control then progresses to 1141 of FIG. 11B.

In FIG. 11B, elements 1148, 1152, 1156, 1160, 1164, and 1168 may be implemented similarly to elements 948, 952, 956, 960, 964, and 968, respectively, of FIG. 9B. However, at 1156 in FIG. 11B, if the total watt-hours of the filter is equal to or greater than the capacity of the filter (Filter_Capacity), controls transfers to 1158. At 1158, control stores the new measured power (Power_New) as the previously measured power (Power_Previous). Control then progresses to 1160. Similarly, after selectively generating an alert at either 1164 or 1168, control progresses to 1158. At 1160, if a new filter is installed, control transfers to 1128 of FIG. 11A; otherwise, control progresses to 1164. At 1164, control sets Sample_Timer to zero. Control then returns to 1141.

At 1141 in FIG. 11B, control receives a measurement of the power presently consumed by the motor of the circulator blower, and stores the measurement as Power_New. For example, a power chip of the air handler monitor module 200 may periodically measure the real power consumed by the motor of the circulator blower 108. In other implementations, the power may be apparent power, and may be periodically calculated as the product of voltage and current. Data that represents the consumed power may then be transmitted to a system external to the air handler monitor module 200, such as the remote monitoring system 304.

In various implementations, the data that represents the consumed power may be transmitted in a frame of data that includes other data associated with operation of the HVAC system—such as voltages, currents, temperatures, and control line status. Frames of data may be transmitted to the external system at a first rate for a predetermined period of time following a new call for heat or cool. For example, frames of data may be transmitted 7.5 times a second for the first 105 seconds following a new call for heat or cool. After the predetermined period of time, a frame of data may be transmitted at a slower rate, such as once every 5 seconds.

In other implementations, the rate at which the frames of data are transmitted is variable. For example, the air handler monitor module 200 may only transmit a frame of data to the remote monitoring system 304 when presently measured or calculated values represent a significant change from the most recently transmitted frame.

As an example, the air handler monitor module 200 may determine significant change based on a comparison of present values to values most recently transmitted. In various implementations, the air handler monitor module 200 determines, for each element (such as a voltage, a temperature, a current, etc.) to be transmitted in a frame, a difference between a present value of the element and the value of the element in the most recently transmitted frame. The air handler monitor module 200 then weights the differences by multiplying each of the differences by a corresponding scalar. The weights may be predetermined and based on the significance of the information represented by the data. The air handler monitor module 200 then calculates the root mean square (RMS) value of all of the weighted differences.

The RMS value is an indicator of how substantially different present values of data are from the last transmission. If the RMS value is greater than a threshold, the air handler monitor module 200 transmits the frame of data that includes the present values; otherwise, the air handler monitor module 200 waits for new values and repeats the process to determine whether to transmit a frame of data that includes the new values.

In some implementations, the threshold may be a variable value that is inversely proportional to the time since the last frame of data was transmitted. For example, the threshold may decrease logarithmically or linearly over time. In other words, as the length of time since the last frame of data was transmitted increases, so does the probability that small determined differences will trigger transmission of a new frame of data. In yet other implementations, the threshold may be a predetermined value.

Control then continues at 1143. If the time since the last sample was received exceeds a threshold, such as 15 minutes, control transfers to 1158, skipping updating the Total_WH value; otherwise, control continues at 1145. The reason for skipping updating the Total_WH is that the likelihood of the new power measurement (Power_New) being applicable to the entire preceding period of the sample timer (which is longer than 15 minutes) is low. Therefore, instead of adding a potentially spurious value, no change is made to Total_WH.

At 1145, control increases the total watt-hours of the filter (Total_WH). For example, control may use equation 10 below to update Total_WH, which relies on the average of Power_New and Power_Old.

$$\text{Total\_WH} = \text{Total\_WH} + \frac{(\text{Power\_New} + \text{Power\_Old})}{2} * \text{Sample\_Timer} \quad (10)$$

In some implementations, control may increment Total_WH based on Power_New and Sample_Timer, exclusive of Power_Old. In other implementations, control may increment Total_WH based on Power_Old and Sample_Timer, exclusive of Power_New.

The increases to Total_WH are based on the presence of a typical level of particulate matter in air returned to the air handler unit 136. As previously discussed, the monitoring system may adjust the value added to Total_WH based on a particulate matter level specific to the HVAC system (such as a measured value). Control then continues with 1148.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used in this application, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WiFi wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, LabVIEW, and Python®.

What is claimed is:

1. A monitoring system for a heating, ventilation, and air conditioning (HVAC) system of a building, the monitoring system comprising:
at least one processor; and
a computer-readable medium that includes instructions executable by the at least one processor, wherein the instructions include:
determining a capacity of a filter of the HVAC system based at least on dimensions of the filter;
determining a threshold based on the capacity of the filter;
monitoring a state of a circulator blower of the HVAC system;
receiving power data associated with the HVAC system from an energy monitor that measures power consumed by all electrical appliances in the building connected to the energy monitor;
calculating a filter usage based on the power data, the state of the circulator blower and one of (i) a power consumed by the circulator blower and (ii) an operation mode of the HVAC system; and
in response to the filter usage exceeding the threshold, generating an alert suggesting replacement of the filter.

2. The monitoring system of claim 1 wherein the instructions include:
in response to receiving a power signal indicative of the power consumed by the circulator blower, accumulating a cumulative power value based on the power signal; and
calculating the filter usage based on the power value.

3. The monitoring system of claim 1 further comprising:
a current sensor configured to measure a current indicative of the power consumed by the circulator blower,
wherein calculating the filter usage includes periodically increasing the filter usage based on the measured current.

4. The monitoring system of claim 3 wherein increasing the filter usage includes adding an average current consumed by the circulator blower calculated over a predetermined period of time to the filter usage.

5. The monitoring system of claim 1 wherein increasing the filter usage includes a stepwise increase for each increment of time in which the state of the circulator blower indicates that the circulator blower is running.

6. The monitoring system of claim 1 wherein:
the instructions includes determining, in response to the circulator blower being on, the operation mode of the HVAC system,
determining the operation mode of the HVAC system includes:
determining the operation mode of the HVAC based on the power data; and
calculating the filter usage includes periodically increasing the filter usage based on the operation mode of the HVAC system.

7. The monitoring system of claim 6 wherein the instructions include:
in response to determining the operation mode of the HVAC system is a cooling mode, adding a first period of time to the filter usage;
in response to determining the operation mode of the HVAC system is a second cooling mode, adding a product of the first period of time and a first adjustment factor to the filter usage;
in response to determining the operation mode of the HVAC system is a heating mode, adding a product of the first period of time and a second adjustment factor to the filter usage;
in response to determining the operation mode of the HVAC system is a second heating mode, adding a product of the first period of time and a third adjustment factor to the filter usage; and
in response to determining the operation mode of the HVAC system is a fan only mode, adding a product of the first period of time and a fourth adjustment factor to the filter usage.

8. The monitoring system of claim 1 wherein the instructions include determining a remaining life of the filter based on a length of time that the filter has been installed in HVAC system, the filter usage, and the capacity of the filter; and wherein the alert suggesting replacement of the filter includes the remaining life of the filter.

9. A method for monitoring a heating, ventilation, and air conditioning (HVAC) system of a building comprising:
determining a capacity of a filter of the HVAC system based at least on dimensions of the filter;
determining a threshold based on the capacity of the filter;
monitoring a state of a circulator blower of the HVAC system;
receiving power data associated with the HVAC system from an energy monitor that measures power consumed by all electrical appliances in the building connected to the energy monitor;
calculating a filter usage based on the power data, the state of the circulator blower, and one of (i) power consumed by the circulator blower and (ii) an operation mode of the HVAC system; and
in response to the filter usage exceeding the threshold, generating an alert suggesting replacement of the filter.

10. The method of claim 9 wherein:
the method further comprises, in response to receiving a power signal indicative of the power consumed by the circulator blower, accumulating a cumulative power value based on the power signal; and
calculating the filter usage based on the power value.

11. The method of claim 9 further comprising:
measuring current indicative of power consumed by the circulator blower using a current sensor; and
periodically increasing the filter usage based on the measured current.

12. The method of claim 11 wherein increasing the filter usage includes adding an average current consumed by the circulator blower calculated over a predetermined period of time to the filter usage.

13. The method of claim 9 wherein increasing the filter usage includes a stepwise increase for each increment of time in which the state of the circulator blower indicates that the circulator blower is running.

14. The method of claim 9 further comprising:
determining, in response to the circulator blower being on, the operation mode of the HVAC system based on the power data,
wherein calculating the filter usage includes periodically increasing the filter usage based on the operation mode of the HVAC system.

15. The method of claim 14 further comprising:
in response to determining the operation mode of the HVAC system is a cooling mode, adding a first period of time to the filter usage;
in response to determining the operation mode of the HVAC system is a second cooling mode, adding a product of the first period of time and a first adjustment factor to the filter usage;
in response to determining the operation mode of the HVAC system is a heating mode, adding a product of the first period of time and a second adjustment factor to the filter usage;
in response to determining the operation mode of the HVAC system is a second heating mode, adding a product of the first period of time and a third adjustment factor to the filter usage; and
in response to determining the operation mode of the HVAC system is a fan only mode, adding a product of the first period of time and a fourth adjustment factor to the filter usage.

16. The method of claim 9 further comprising determining a remaining life of the filter based on a length of time that the filter has been installed in HVAC system, the filter usage, and the capacity of the filter,
wherein the alert suggesting replacement of the filter includes the remaining life of the filter.

17. The method of claim 9 further comprising generating, in response to the filter usage equaling or exceeding the capacity of the filter, an alert indicating that the filter needs to be replaced.

18. A monitoring system for a heating, ventilation, and air conditioning (HVAC) system of a building, the monitoring system comprising:
at least one processor; and
a computer-readable medium that includes instructions executable by the at least one processor, wherein the instructions include:
determining a capacity of a filter of the HVAC system based at least on dimensions of the filter;
determining a threshold based on the capacity of the filter;
receiving power data associated with the HVAC system from an energy monitor that measures power consumed by all electrical appliances in the building connected to the energy monitor;
determining a total power value based on power consumed by a circulator blower of the HVAC system since the filter was installed;
calculating a filter usage based on the power data and the total power value; and
in response to the filter usage exceeding the threshold, generating an alert suggesting replacement of the filter.

19. The monitoring system of claim 18 wherein the instructions include:
receiving data from a power measurement chip of the HVAC system, wherein the data indicates a present power consumed by the circulator blower; and
increasing the total power value based on the received data.

20. The monitoring system of claim 18 wherein the instructions include generating, in response to the filter usage equaling or exceeding the capacity of the filter, an alert indicating that the filter needs to be replaced.

* * * * *